(12) United States Patent
Hattori et al.

(10) Patent No.: US 10,567,767 B2
(45) Date of Patent: Feb. 18, 2020

(54) IMAGE PROCESSING APPARATUS AND NON-TRANSITORY COMPUTER READABLE MEDIUM

(71) Applicant: FUJI XEROX CO., LTD., Tokyo (JP)

(72) Inventors: Keigo Hattori, Ashigarakami-gun (JP); Taro Yokose, Ashigarakami-gun (JP); Tomoki Taniguchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 83 days.

(21) Appl. No.: 15/240,920

(22) Filed: Aug. 18, 2016

(65) Prior Publication Data

US 2017/0272752 A1    Sep. 21, 2017

(30) Foreign Application Priority Data

Mar. 16, 2016    (JP) ................. 2016-052655

(51) Int. Cl.
*H04N 19/124* (2014.01)
*H04N 19/176* (2014.01)
*H04N 19/136* (2014.01)

(52) U.S. Cl.
CPC ......... *H04N 19/124* (2014.11); *H04N 19/136* (2014.11); *H04N 19/176* (2014.11)

(58) Field of Classification Search
CPC ... H04N 19/124; H04N 19/176; H04N 19/136
USPC .................................................. 375/240.03
See application file for complete search history.

(56) References Cited

U.S. PATENT DOCUMENTS

| 2008/0187052 | A1* | 8/2008 | Terada | ................ | H04N 19/176 375/240.24 |
|---|---|---|---|---|---|
| 2009/0092331 | A1 | 4/2009 | Genda et al. | | |
| 2009/0232237 | A1* | 9/2009 | Nakanishi | ............. | H04L 5/0044 375/260 |
| 2010/0328387 | A1* | 12/2010 | Nakazawa | ............. | B41J 25/005 347/14 |
| 2012/0051659 | A1* | 3/2012 | Ashida | ..................... | G06K 9/38 382/252 |

FOREIGN PATENT DOCUMENTS

| JP | H05-56282 A | 3/1993 |
|---|---|---|
| JP | 2008-227759 A | 9/2008 |
| JP | 2009-094619 A | 4/2009 |
| JP | 2010-103681 A | 5/2010 |
| JP | 2014-135574 A | 7/2014 |

OTHER PUBLICATIONS

Oct. 8, 2019 Office Action issued in Japanese Patent Application No. 2016-052655.

* cited by examiner

*Primary Examiner* — On S Mung
(74) *Attorney, Agent, or Firm* — Oliff PLC

(57) ABSTRACT

There is provided an image processing apparatus. A splitting unit splits an image into a block. A quantization unit performs quantization of the block using a plurality of methods. A calculating unit calculates a distance between the block and a result of the quantization. A selecting unit selects a quantization result of the quantization unit using the distance. An encoding unit performs fixed-length encoding of the quantization result selected by the selecting unit. The quantization unit includes a first quantization unit that preserves texture in the block, and a second quantization unit that represents pixels in the block in a plurality of colors.

10 Claims, 35 Drawing Sheets

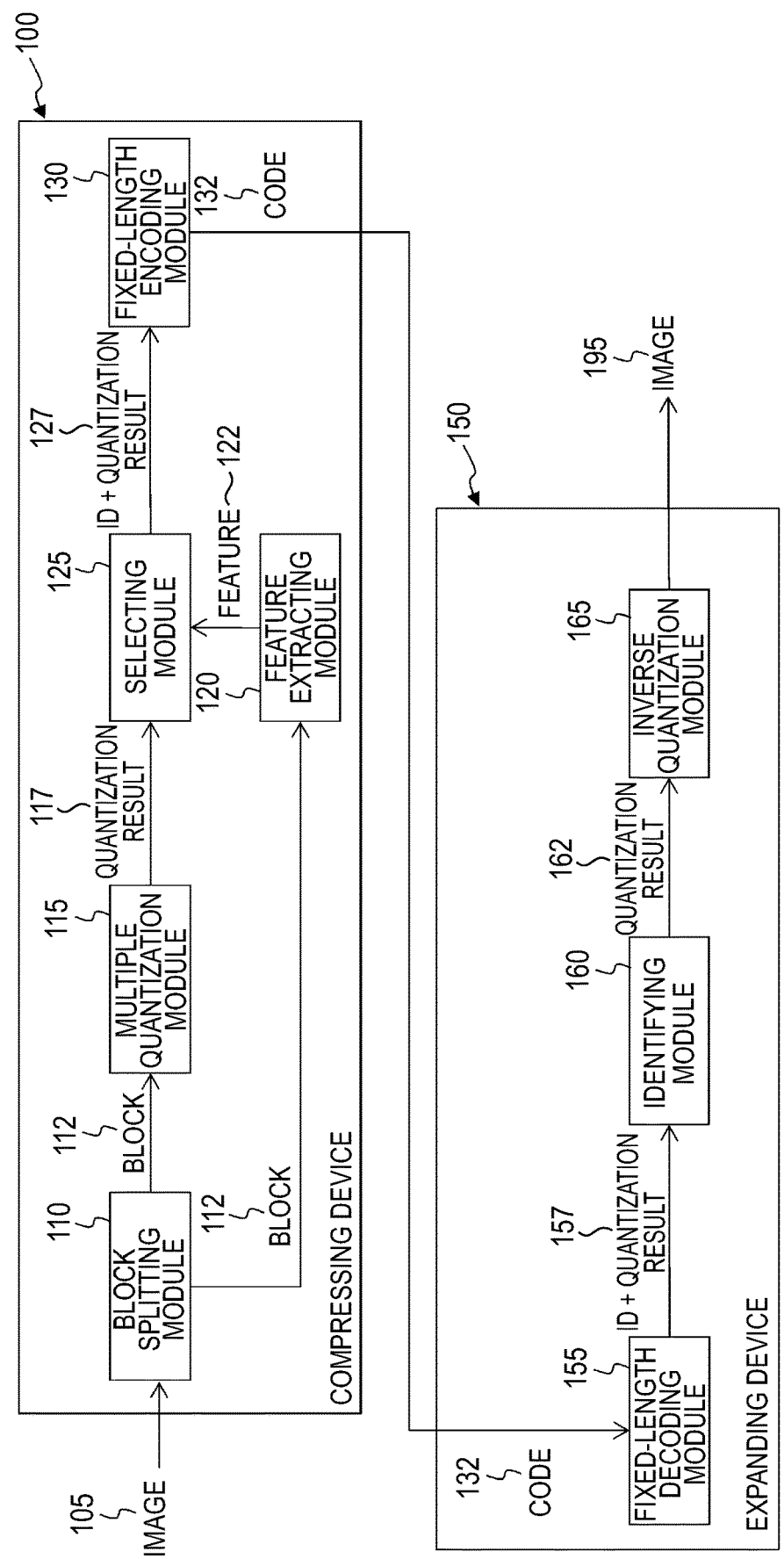

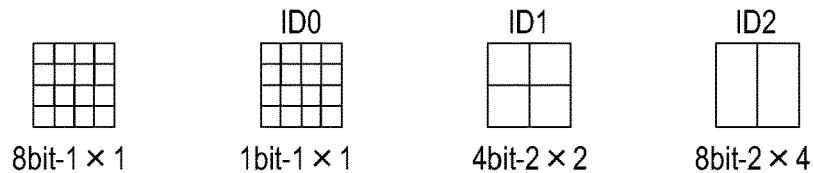
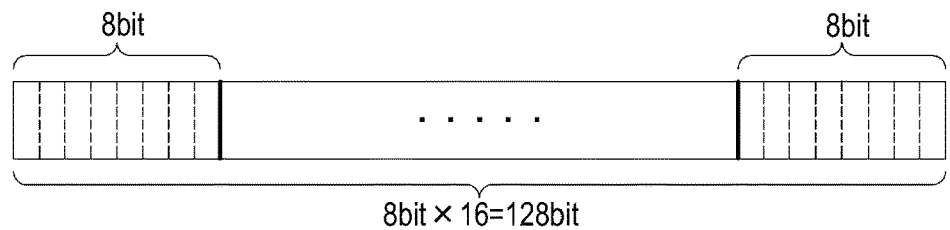
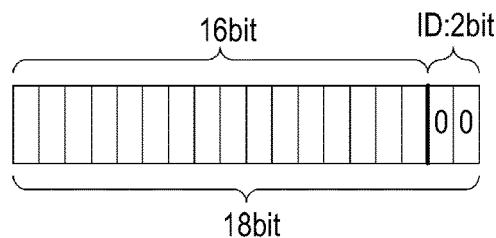
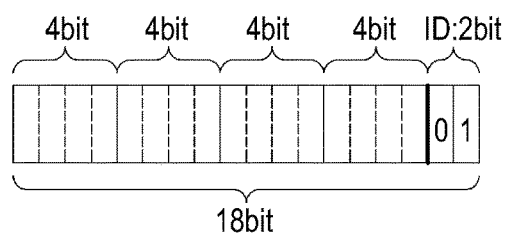
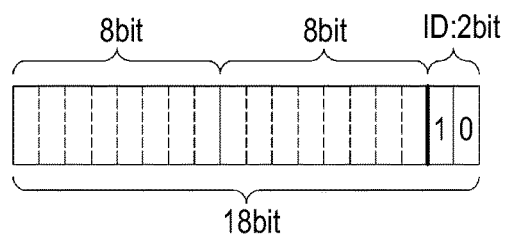
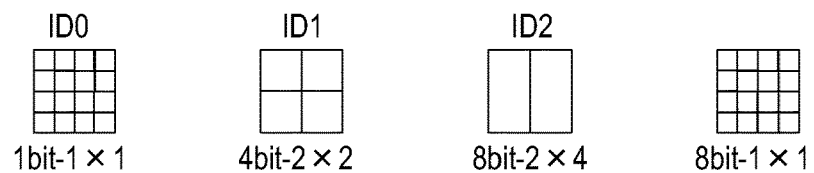

FIG.3

| FIXED-LENGTH REPRESENTATION | CHARACTER | GRAY CHARACTER | GRADATION |
|---|---|---|---|
| ORIGINAL IMAGE<br>8bit × 16 = 128bit<br>8bit-1×1 | a | a | (gradation) |
| HIGH RESOLUTION / FEWER TONES<br>(TWO VALUES OF BLACK AND WHITE)<br>1 × 16 = 16bit<br>1bit-1×1 | ○←IMAGE QUALITY<br>a | × COLOR CHANGE, REMOVAL | × TONE DIFFERENCE |
| MEDIUM RESOLUTION / MEDIUM TONES<br>4 × 4 = 16bit<br>4bit-2×2 | × BLUR | ○<br>a | × TONE DIFFERENCE |
| LOW RESOLUTION / MORE TONES<br>8 × 2 = 16bit<br>8bit-2×4 | × BLUR | × BLUR | ○<br>(gradation) |

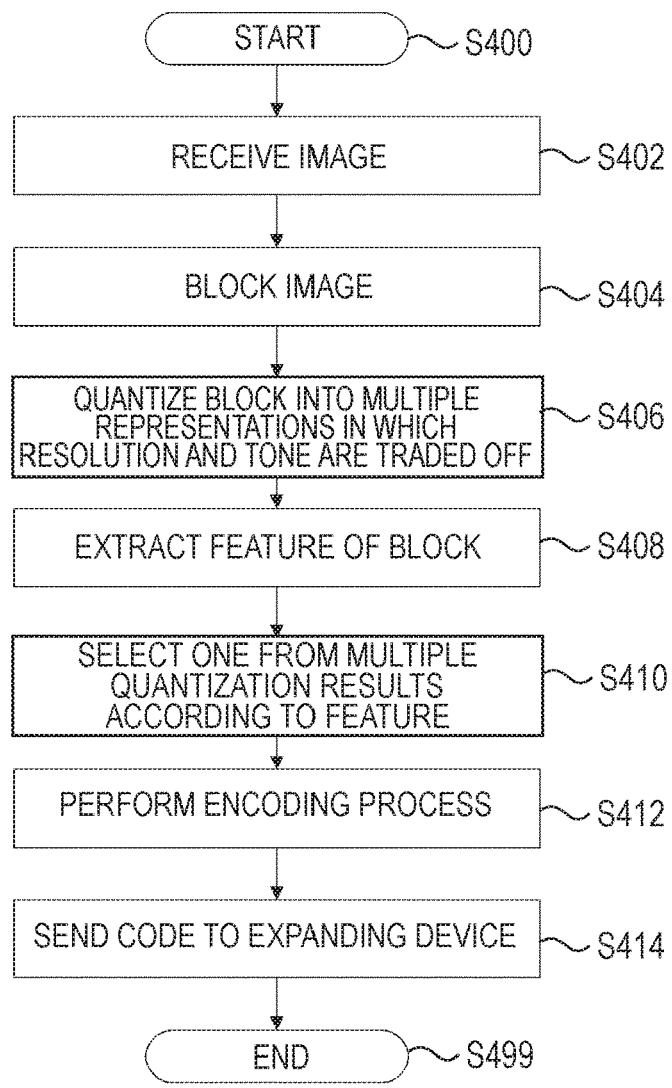
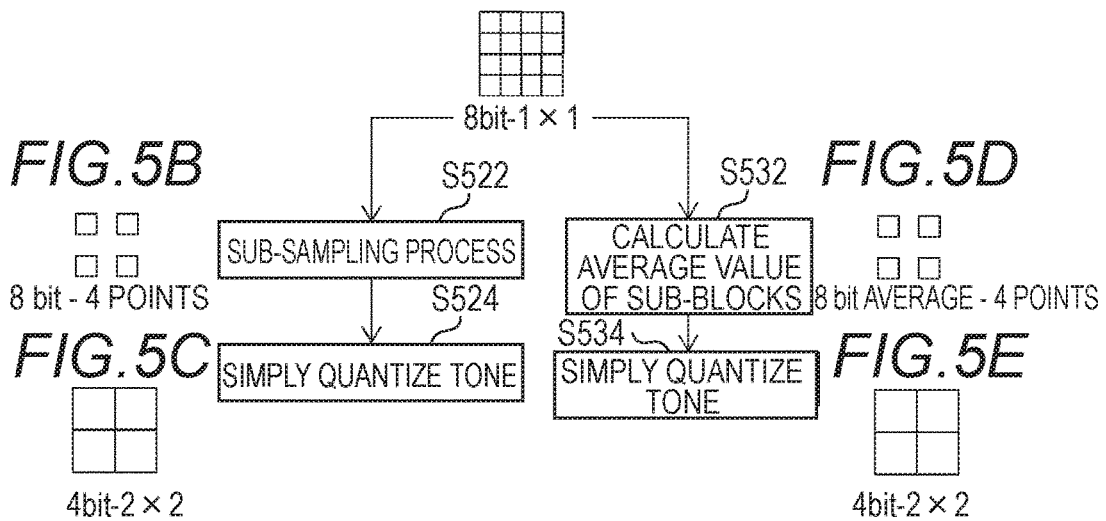

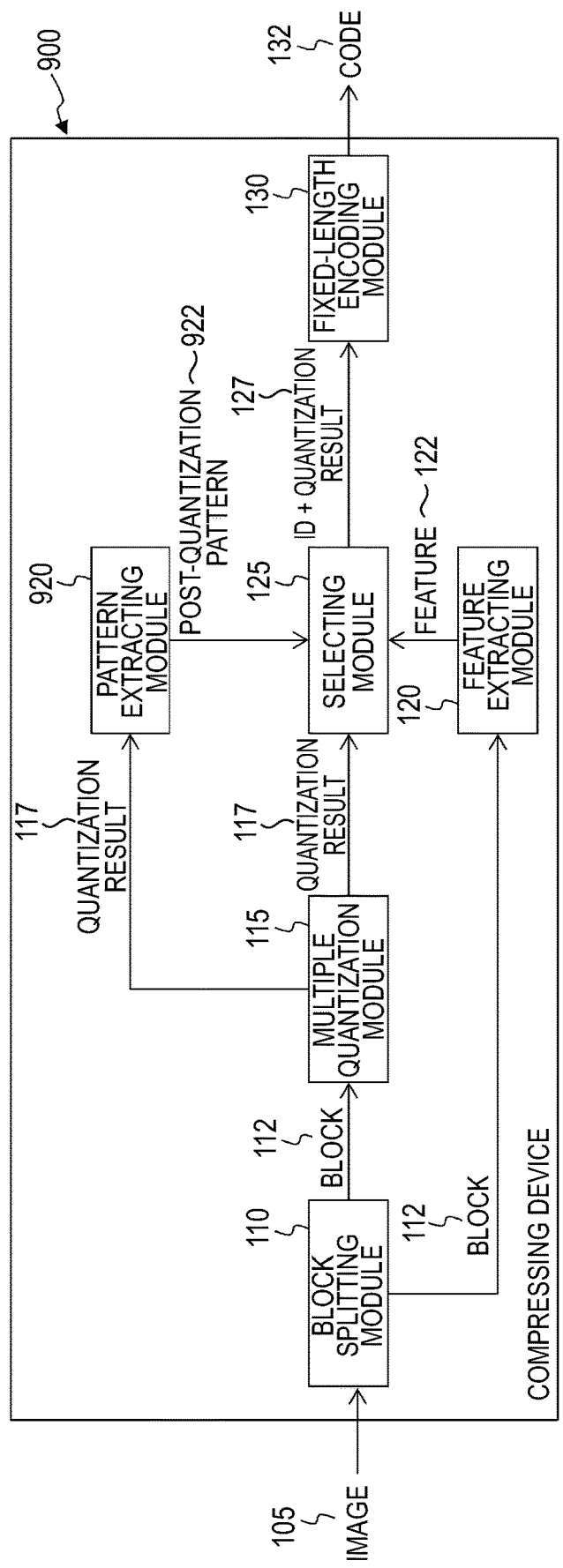

FIG.10A
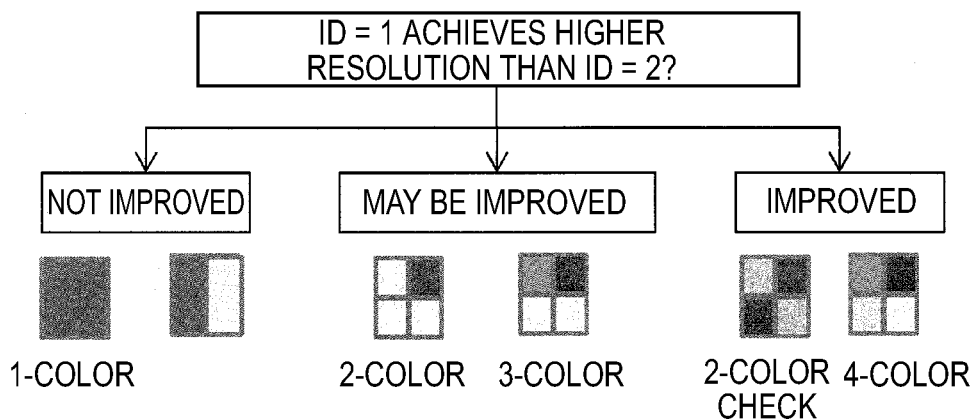
FIG.10B
FIG.11
| D RANGE | ONE-COLOR | EQUAL TWO-COLOR ID2 | TWO-COLOR | CHECK | THREE-COLOR | FOUR-COLOR |
|---|---|---|---|---|---|---|
| 255 | ID0 | ID0 | ID0 | ID0 | ID0 | ID0 |
| 16~254 | ID2 | ID2 | ID2 | ID1 | ID1 | ID1 |
| LESS THAN 16 | ID2 | ID2 | ID2 | ID2 | ID2 | ID2 |

FIG.13
| | ID | 0 | 1 | 2 | 3 |
|---|---|---|---|---|---|
| | FORM |  1bit-1×1 |  4bit-2×2 |  8bit-2×4 |  8bit-4×2 |

FIG.18
| ID | 0 | 1 | 2 | 3 |
|---|---|---|---|---|
| REPRESENTATION | TEXTURE-PRESERVING | TWO-COLOR | TWO-COLOR | TWO-COLOR |
| FORM | ANY | 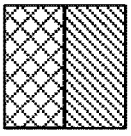 | 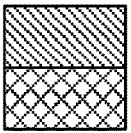 |  |
| DATA PORTION | 8 bit PATTERN<br>8 bit TONE |  8 bit TONE OF<br> 8 bit TONE OF |  8 bit TONE OF<br> 8 bit TONE OF |  8 bit TONE OF<br> 8 bit TONE OF |

FIG.21

| PID | 16 bit REPRESENTATION (HEXADECIMAL) | FORM |
|---|---|---|
| 0 | 0x7777 | |
| 1 | ~0x7777 | |
| 2 | 0x000f | |
| 3 | ~0x000f | |
| ... | | |

| ID | PID | TONE OF COLOR 1 | TONE OF COLOR 2 |
|---|---|---|---|
| 2bit | 8bit | 4bit | 4bit |

| ID | 0 | 1 | 2 | 3 | 4 | 5 | 6 | 7 |
|---|---|---|---|---|---|---|---|---|
| REPRESENTATION | TEXTURE-PRESERVING | TWO-COLOR | TWO-COLOR | TWO-COLOR | TWO-COLOR | TWO-COLOR | TWO-COLOR | TWO-COLOR |
| FORM | ANY | | | | | | | |

FIG.30
| ID | 0 | 1 | 2 | 3 |
|---|---|---|---|---|
| REPRESENTATION | HIGH-RESOLUTION/FEWER-TONE | TONE-PRESERVING | TWO-COLOR | TWO-COLOR |
| FORM | ANY |  | 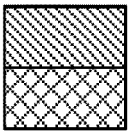 | 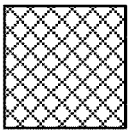 |
| DATA PORTION | 8 bit PATTERN |  8 bit TONE OF ■ |  4 bit TONE OF ■　4 bit TONE OF ■ |  4 bit TONE OF ■　4 bit TONE OF ■ |

FIG.33

| PID | 16 bit REPRESENTATION (HEXADECIMAL) | FORM |
|---|---|---|
| 0 | 0x7777 | |
| 1 | ~0x7777 | |
| 2 | 0x000f | |
| 3 | ~0x000f | |
| ... | | |

| ID | PID | TONE |
|---|---|---|
| 2bit | 4bit | 4bit |

| ID | 0 | 1 | 2 | 3 | 4 | 5 | 6 | 7 |
|---|---|---|---|---|---|---|---|---|
| REPRESENTATION | HIGH-RESOLUTION/FEWER-TONE | TONE-PRESERVING | TWO-COLOR | TWO-COLOR | TWO-COLOR | TWO-COLOR | TWO-COLOR | TWO-COLOR |
| FORM | ANY | ▦ | ▦ | ▦ | ▦ | ▦ | ▦ | ▦ |

FIG.36

| ID | 0 | 1 | 2 | 3 | 4 | 5 | 6 | 7 |
|---|---|---|---|---|---|---|---|---|
| REPRESENTATION | HIGH-RESOLUTION/FEWER-TONE | TONE-PRESERVING | TWO-COLOR | TWO-COLOR | TWO-COLOR | TWO-COLOR | TWO-COLOR | TWO-COLOR |
| FORM | ANY | | | | | | | |

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-052655 filed Mar. 16, 2016.

TECHNICAL FIELD

The present invention relates to an image processing apparatus and a non-transitory computer readable medium.

SUMMARY

According to an aspect of the embodiments of the present invention, there is provided an image processing apparatus comprising a splitting unit that splits an image into a block; a quantization unit that performs quantization of the block using a plurality of methods; a calculating unit that calculates a distance between the block and a result of the quantization; a selecting unit that selects a quantization result of the quantization unit using the distance; and an encoding unit that performs fixed-length encoding of the quantization result selected by the selecting unit, wherein the quantization unit includes a first quantization unit that preserves texture in the block, and a second quantization unit that represents pixels in the block in a plurality of colors.

BRIEF DESCRIPTION OF THE DRAWINGS

Exemplary embodiments of the present invention will be described in detailed based on the following figures, wherein:

FIG. 1 is a conceptual module configuration diagram for a configuration example of a first exemplary embodiment;

FIGS. 2A, 2B, 2C, 2D, 2E, 2F, 2G, 2H, 2I, 2J, 2K, and 2L are descriptive diagrams illustrating a process example of the first exemplary embodiment;

FIG. 3 is a descriptive diagram illustrating a process example of the first exemplary embodiment;

FIG. 4 is a flowchart illustrating a process example of the first exemplary embodiment;

FIGS. 5A, 5B, 5C, 5D, and 5E are flowcharts illustrating a process example of the first exemplary embodiment;

FIG. 9 is a conceptual module configuration diagram for a configuration example of a second exemplary embodiment;

FIGS. 10A and 10B are descriptive diagrams illustrating a process example of the second exemplary embodiment;

FIG. 11 is a descriptive diagram illustrating a data structure example of a feature and pattern correspondence table;

FIG. 13 is a descriptive diagram illustrating a data structure example of a form identifier and representative pixel value definition table;

FIG. 18 is a descriptive diagram illustrating a process example of the fifth exemplary embodiment;

FIG. 21 is a descriptive diagram illustrating a process example of the fifth exemplary embodiment;

FIG. 22 is a descriptive diagram illustrating a process example of a sixth exemplary embodiment;

FIG. 23 is a descriptive diagram illustrating a process example of a seventh exemplary embodiment;

FIG. 30 is a descriptive diagram illustrating a process example of the eleventh exemplary embodiment;

FIG. 33 is a descriptive diagram illustrating a process example of the eleventh exemplary embodiment;

FIG. 34 is a descriptive diagram illustrating a process example of a twelfth exemplary embodiment;

FIG. 35 is a descriptive diagram illustrating a process example of a thirteenth exemplary embodiment;

FIG. 36 is a descriptive diagram illustrating a process example of a fourteenth exemplary embodiment;

DETAILED DESCRIPTION

Figures 6, 7:
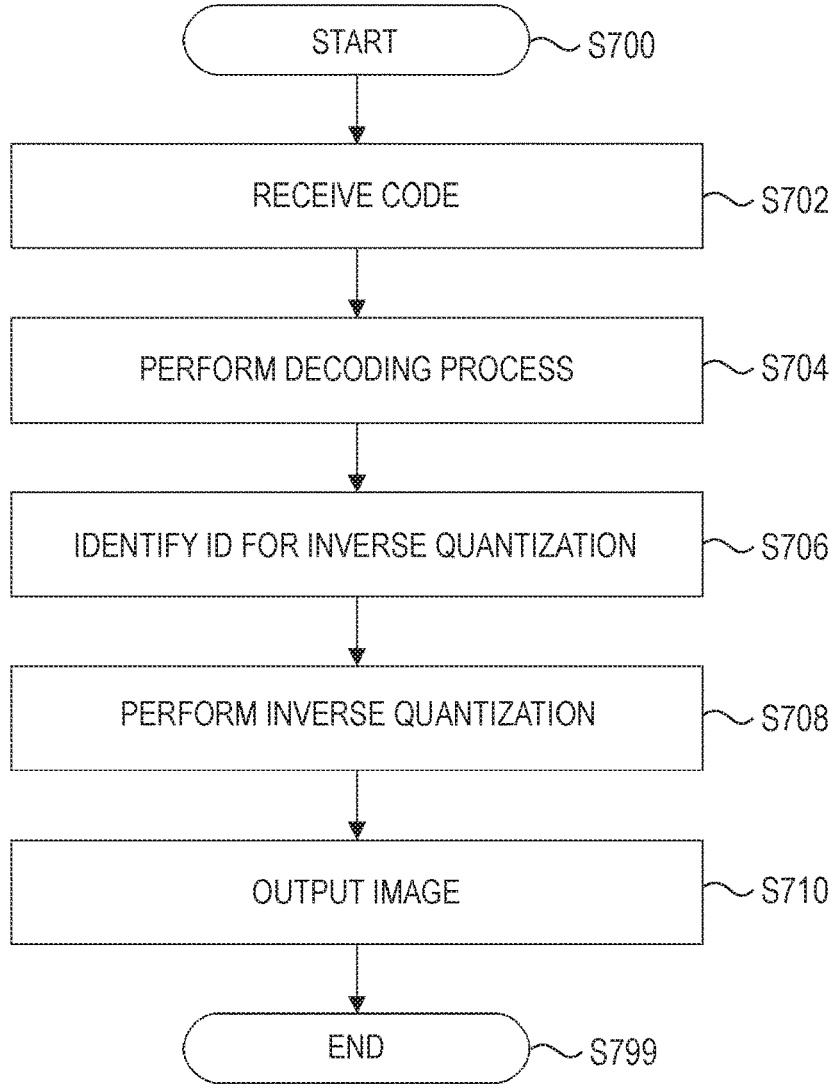
FIG. 6 is a descriptive diagram illustrating a data structure example of a feature and quantization ID correspondence table.
FIG. 7 is a flowchart illustrating a process example of the first exemplary embodiment.

Hereinafter, an example of various exemplary embodiments for realizing the present invention will be described based on the drawings.

(First Exemplary Embodiment)

FIG. 1 illustrates a conceptual module configuration diagram for a configuration example of a first exemplary embodiment.

A module generally refers to a logically separable component of software (computer program), hardware, and the like. Therefore, a module in the present exemplary embodiment refers to not only a module in a computer program but also a module in a hardware configuration. Accordingly, the present exemplary embodiment describes a computer program that provides functionality as modules (a program that causes a computer to execute individual procedures, a program that causes a computer to function as individual units, or a program that causes a computer to realize individual functions) and a system and a method as well. While the terms "store" and "stored" and the equivalents thereof are used for convenience of description, these terms mean storing in a storage device or controlling to store in a storage device in a case where the exemplary embodiment is a computer program. Modules may correspond one-to-one to functions.

In implementation, one module may be configured of one program, multiple modules may be configured of one program, or conversely one module may be configured of multiple programs. Multiple modules may be executed by one computer.

One module may be executed by multiple computers that are computers in a distributed or parallel environment. One module may include another module. Hereinafter, the term "connection" will be used in a case of logical connection (data exchange, instructions, reference relationships among data, and the like) in addition to physical connection. The term "predetermined" will refer to being determined before a target process and is used to include the meaning of being determined in accordance with the status or the state at or until the point in time before not only the start of processes of the present exemplary embodiment but also before a target process even if processes of the present exemplary embodiment are started. A "predetermined value", if existing in multiple numbers, may be a different value from each other, or two or more values (apparently includes all values) may be the same. A description having the meaning of "B is performed in a case where A is true" will be used to mean "a determination as to whether or not A is true is performed and B is performed in a case where A is determined to be true". Exceptions are made in a case where a determination as to whether or not A is true is not required.

A system or an apparatus is not only configured by connecting multiple computers, hardware, devices, and the like with a communication unit such as a network (includes one-to-one communication connection) but also is realized by one computer, hardware, device, or the like. The terms "apparatus" and "system" will be used as terms having the same definition. Apparently, "system" does not include a system that is limited to a social "structure" (social system) which is artificial agreement.

Information of a target will be read from a storage device in each process performed by each module or in each process in a case where multiple processes are performed in a module, and the process result will be written to the storage device after the process is performed. Therefore, reading from the storage device before the process and writing to the storage device after the process may not be described. The storage device referred hereto may include a hard disk, a random access memory (RAM), an external storage medium, a storage device connected through a communication line, a register in a central processing unit (CPU), and the like.

A compressing device 100 of an image processing apparatus that is the first exemplary embodiment compresses an image 105 and, as illustrated in FIG. 1, includes a block splitting module 110, a multiple quantization module 115, a feature extracting module 120, a selecting module 125, and a fixed-length encoding module 130. An expanding device 150 of the image processing apparatus that is the first exemplary embodiment decodes a code 132 that is compressed by the compressing device 100, to generate an image 195 and, as illustrated in FIG. 1, includes a fixed-length decoding module 155, an identifying module 160, and an inverse quantization module 165.

The block splitting module 110 of the compressing device 100 is connected to the multiple quantization module 115 and the feature extracting module 120 and receives the image 105 and passes a block 112 to the multiple quantization module 115 and the feature extracting module 120. The block splitting module 110 splits the image 105 into blocks. Receiving images includes, for example, reading images with a scanner, a camera, and the like, receiving images with a facsimile and the like from an external machine through a communication line, reading images that are stored in a hard disk (includes a network-connected hard disk and the like in addition to a hard disk incorporated in a computer), receiving print images from other information processing apparatuses, and the like. The image is a multivalued image (includes a color image). The received image may be one or more in number. The content of the image may be a document used for business, an advertising pamphlet, and the like. The block has a rectangular shape and generally a square shape but is not limited thereto.

The example illustrated in FIG. 2A is a process result of the block splitting module 110. For example, the process result is "tone: 8 bit—resolution (sub-block): 1×1" (hereinafter, represented as "8 bit—1×1").

The multiple quantization module 115 is connected to the block splitting module 110 and the selecting module 125 and receives the block 112 from the block splitting module 110 and passes a quantization result 117 to the selecting module 125. The multiple quantization module 115 quantizes the block 112, which is split by the block splitting module 110, using multiple methods. The "multiple methods" are different from each other. For example, the multiple quantization module 115 may perform quantization using multiple methods in such a manner that the resolution and the tone have a trade-off relationship in the quantization result. In this case, the quantization result 117 includes multiple representations in which the resolution and the tone of the block 112 are traded off. The "trade-off relationship" refers to an antinomic relationship and refers to a relationship in which the tone is required to be decreased in order to increase the resolution while the resolution has to be decreased in order to increase the tone.

The examples illustrated in FIGS. 2B, 2C, and 2D illustrate multiple (three) process results of the multiple quantization module 115. For example, FIG. 2B is 1 bit—1×1 (the number of bits of the tone: 1, the size of the resolution: the same size as the original pixel), FIG. 2C is 4 bit—2×2 (the number of bits of the tone: 4, the size of the resolution: the size 2 (width)×2 (height) larger than the original pixel), and FIG. 2D is 8 bit—2×4 (the number of bits of the tone: 8, the size of the resolution: the size 2 (width)×4 (height) larger than the original pixel).

The feature extracting module 120 is connected to the block splitting module 110 and the selecting module 125 and receives the block 112 from the block splitting module 110 and passes a feature 122 to the selecting module 125. The feature extracting module 120 extracts a feature of the block 112 that is split by the block splitting module 110. Features are extracted for each block. The feature extracting module 120, for example, may extract the dynamic range of the block 112 as a feature. The dynamic range refers to the width (the width defined by the maximum value and the minimum value) of a pixel value in a block of a target.

The selecting module 125 is connected to the multiple quantization module 115, the feature extracting module 120, and the fixed-length encoding module 130 and receives the quantization result 117 from the multiple quantization module 115 and the feature 122 from the feature extracting module 120 and passes an "ID+quantization result" 127 to the fixed-length encoding module 130. The selecting module 125 selects the quantization result 117 of the multiple quantization module 115 that corresponds to the feature 122 extracted by the feature extracting module 120. That is, one quantization result that corresponds to one block is selected from multiple quantization results. A result of the selecting process may include, in addition to the quantization result, an identification (ID) that is information indicating a quantization method or a representation method for the quantization result.

The fixed-length encoding module 130 is connected to the selecting module 125 and receives the "ID+quantization result" 127 from the selecting module 125 and outputs the code 132. The fixed-length encoding module 130 performs fixed-length encoding of the quantization result selected by the selecting module 125. The fixed-length encoding module 130 may perform fixed-length encoding of the "ID+quantization result" 127 selected by the selecting module 125. Since fixed-length encoding is performed, the code 132 for one block has a constant length. Fixed-length encoding may use an existing technology. Examples of process results of the fixed-length encoding module 130 are illustrated in FIGS. 2F, 2G, and 2H. The example illustrated in FIG. 2E illustrates the bit representation of one block of the original image.

The bit representation includes 16 contiguous pixels, each of which has 8 bits (total 128 bits). The example illustrated in FIG. 2F illustrates a bit representation corresponding to FIG. 2B as a result of a fixed-length encoding process.

The bit representation includes 16 contiguous pixels, each of which has one bit as a representative value, and two bits added as the ID (ID0: 00) (total 18 bits). The number of bits of the ID is preferably greater than or equal to the number of bits that allows representation of the number of types of the ID. Two bits are used in these examples since three types ID0, ID1, and ID2 are illustrated. The example illustrated in FIG. 2G illustrates a bit representation corresponding to FIG. 2C as a result of a fixed-length encoding process.

The bit representation includes four contiguous pixels, each of which has four bits as a representative value, and two bits added as the ID (ID1: 01) (total 18 bits). The example illustrated in FIG. 2H illustrates a bit representation corresponding to FIG. 2D as a result of a fixed-length encoding process.

The bit representation includes two contiguous pixels, each of which has 8 bits as a representative value, and two bits added as the ID (ID2: 10) (total 18 bits). The positional relationship between the result of the fixed-length encoding process and the ID may be different from those illustrated (for example, the ID is inserted at the head of the result).

The fixed-length decoding module 155 of the expanding device 150 is connected to the identifying module 160 and receives the code 132 and passes an "ID+quantization result" 157 to the identifying module 160. The fixed-length decoding module 155 decodes the code 132. Apparently, decoding corresponds to fixed-length encoding. A decoding result is the quantization result. The "ID+quantization result" 157 is the quantization result in a case where the above ID is included in the code 132.

The identifying module 160 is connected to the fixed-length decoding module 155 and the inverse quantization module 165 and receives the "ID +quantization result" 157 from the fixed-length decoding module 155 and passes a quantization result 162 to the inverse quantization module 165. The identifying module 160 obtains the above ID from the "ID+quantization result" 157.

The inverse quantization module 165 is connected to the identifying module 160 and receives the quantization result 162 from the identifying module 160 and outputs the image 195. The inverse quantization module 165 performs inverse quantization of the quantization result 162 to restore the original image. The inverse quantization of the quantization result 162 is performed according to the above ID to restore the original image in a case where the ID is included in the quantization result 162. The inverse quantization method corresponds to the quantization method that generates the quantization result selected by the selecting module 125.

One of the examples illustrated in FIGS. 2I, 2J, and 2K are selected by the inverse quantization module 165 according to an identification result of the identifying module 160 and is used in inverse quantization. FIG. 2I corresponds to FIG. 2B, FIG. 2J corresponds to FIG. 2C, and FIG. 2K corresponds to FIG. 2D.

The example illustrated in FIG. 2L is a process result of the inverse quantization module 165.

A fixed-length representation in which the resolution and the tone are traded off according to the feature of the block is selected. Accordingly, for example, the ID has two bits, the quantization result has 16 bits, and total 18 bits [blocks] (16×8/18=7.11) are encoded as the code 132 (refer to the above examples illustrated in FIGS. 2F, 2G, and 2H).

The inverse quantization module 165 outputs the restored image 195. Outputting an image includes, for example, printing the image using a printing device such as a printer, displaying the image on a display device such as a display, sending the image using an image sending device such as a facsimile, writing the image to an image storage device such as an image database, storing the image in a storage medium such as a memory card, and passing the image to other information processing apparatuses.

The principle of the exemplary embodiment will be described by using the example of FIG. 3.

It is determined through research by the inventor that the original image can be sufficiently reproduced when trade-offs are made along the resolution axis and the tone axis for each block of a target. The present exemplary embodiment uses this result and performs fixed-length representation in which the resolution (the size of a sub-block represented flat) and the tone (the number of bits) are traded off for each block.

The first row of the example of FIG. 3 illustrates the block of the original image. The amount of encoding is 128 bits. Since the original image is not encoded (the amount of information thereof is not decreased), a character, a gray character (a character having tones), and a gradation (includes a photograph and the like) are reproduced as illustrated in the example of the first row.

The second row of the example of FIG. 3 illustrates a quantization example in which the block of the original image in the first row is set to have high resolution and fewer tones (two values of black and white). The amount of encoding is 16 bits (a tone of one bit×16). In this case, there is no problem of image quality in reproduction in a case where the example is applied to a character. However, color changes and partial removals mostly occur in a case where the example is applied to a gray character. Tone differences mostly occur in a case where the example is applied to a gradation.

The third row of the example of FIG. 3 illustrates a quantization example in which the block of the original image in the first row is set to have medium resolution and medium tones. The amount of encoding is 16 bits (a tone of four bits×4). In this case, there is no problem of image quality in reproduction in a case where the example is applied to a gray character. However, blurs mostly occur in a case where the example is applied to a character. Tone differences mostly occur in a case where the example is applied to a gradation.

The fourth row of the example of FIG. 3 illustrates a quantization example in which the block of the original image in the first row is set to have low resolution and more tones. The amount of encoding is 16 bits (a tone of 8 bits×2). In this case, there is no problem of image quality in reproduction in a case where the example is applied to a gradation. However, blurs mostly occur in a case where the example is applied to a character. Blurs mostly occur in a case where the example is applied to a gray character.

That is, although quantization may not deal with all of a character, a gray character, and a gradation in terms of image quality, some can be dealt with in terms of image quality when quantization is performed with high resolution and fewer tones, medium resolution and medium tones, and low resolution and more tones. These types of quantization are appropriately used according to the feature of the block. Apparently, quantization that is performed differently from the examples in FIG. 3 (high resolution and fewer tones, medium resolution and medium tones, and low resolution and more tones) may be adopted.

FIG. 4 is a flowchart illustrating a process example of the first exemplary embodiment.

In Step S402, the block splitting module 110 receives the image 105.

In Step S404, the block splitting module 110 blocks the image 105.

In Step S406, the multiple quantization module 115 quantizes the block 112 into multiple representations in which the resolution and the tone are traded off. A detailed process example will be described later by using FIGS. 5A to 5E.

In Step S408, the feature extracting module 120 extracts the feature 122 of the block 112.

In Step S410, the selecting module 125 selects one from multiple quantization results 117 according to the feature 122. A detailed process example will be described later by using FIG. 6.

In Step S412, the fixed-length encoding module 130 performs an encoding process.

In Step S414, the fixed-length encoding module 130 sends the code 132 to the expanding device 150.

FIGS. 5A to 5E are flowcharts of two types illustrating a process example of the first exemplary embodiment (multiple quantization module 115). Quantization is performed with medium resolution and medium tones in these examples.

The example illustrated in FIG. 5A is a process result of the block splitting module 110 and illustrates one block of the original image. The flowchart on the left (Step S522 and Step S524) uses sub-sampling and quantization, and the flowchart on the right (Step S532 and Step S534) uses an average value and quantization.

In Step S522, a sub-sampling process is performed. The example illustrated in FIG. 5B illustrates a process result of Step S522. Pixels are selected from the example illustrated in FIG. 5A.

In Step S524, the tone is simply quantized. The example illustrated in FIG. 5C illustrates a process result of Step S524. The pixel values of the example illustrated in FIG. 5B are quantized.

In Step S532, the average value of sub-blocks is calculated. The example illustrated in FIG. 5D illustrates a process result of Step S532. The average value of four pixels is calculated from the example illustrated in FIG. 5A.

In Step S534, the tone is simply quantized. The example illustrated in FIG. 5E illustrates a process result of Step S534. The pixel values of the example illustrated in FIG. 5D are quantized.

Quantization with low resolution and more tones can be performed by equivalent processes.

Quantization with high resolution and fewer tones may be performed by an existing binarizing process.

FIG. 6 is a descriptive diagram illustrating a data structure example of a feature and quantization ID correspondence table 600. The feature and quantization ID correspondence table 600 includes a D range field 610 and an ID field 620. The D range field 610 stores a dynamic range. The ID field 620 stores an ID (information that indicates a quantization method or a representation method for a quantization result) corresponding to the dynamic range.

The first row of the feature and quantization ID correspondence table 600 indicates high resolution and fewer tones (black and white) in a case where the dynamic range is equal to 255 (refer to FIG. 2B).

The second row indicates medium resolution and medium tones in a case where the dynamic range is 16 to 254 (refer to FIG. 2C).

The third row indicates low resolution and more tones in a case where the dynamic range is less than 16 (refer to FIG. 2D). Apparently, the numerical values are examples, and the three IDs are examples as well. The ID, in a case where the feature extracting module 120 extracts a feature different from the dynamic range, is associated with the dynamic range according to the value of the feature.

The selecting module 125 searches for the D range field 610 corresponding to the feature 122 and extracts the corresponding ID field 620. One of the multiple quantization results 117 is selected according to the ID.

FIG. 7 is a flowchart illustrating a process example of the first exemplary embodiment (expanding device 150).

In Step S702, the fixed-length decoding module 155 receives the code 132.

In Step S704, the fixed-length decoding module 155 performs a decoding process.

In Step S706, the identifying module 160 identifies the ID for inverse quantization.

In Step S708, the inverse quantization module 165 performs inverse quantization. The inverse quantization is performed according to the ID by using the above feature and quantization ID correspondence table 600.

In Step S710, the inverse quantization module 165 outputs the image 195.

Figure 8A:
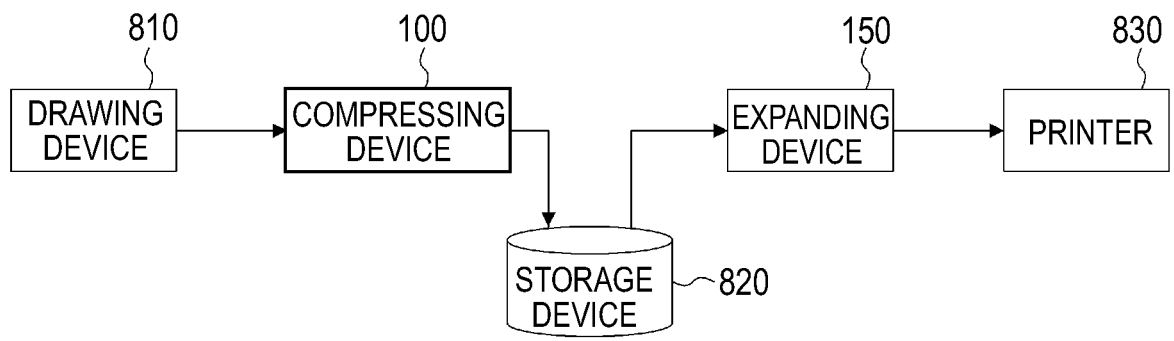
FIGS. 8A and 8B are descriptive diagrams illustrating a system configuration example that uses the present exemplary embodiment.
Figure 8B:
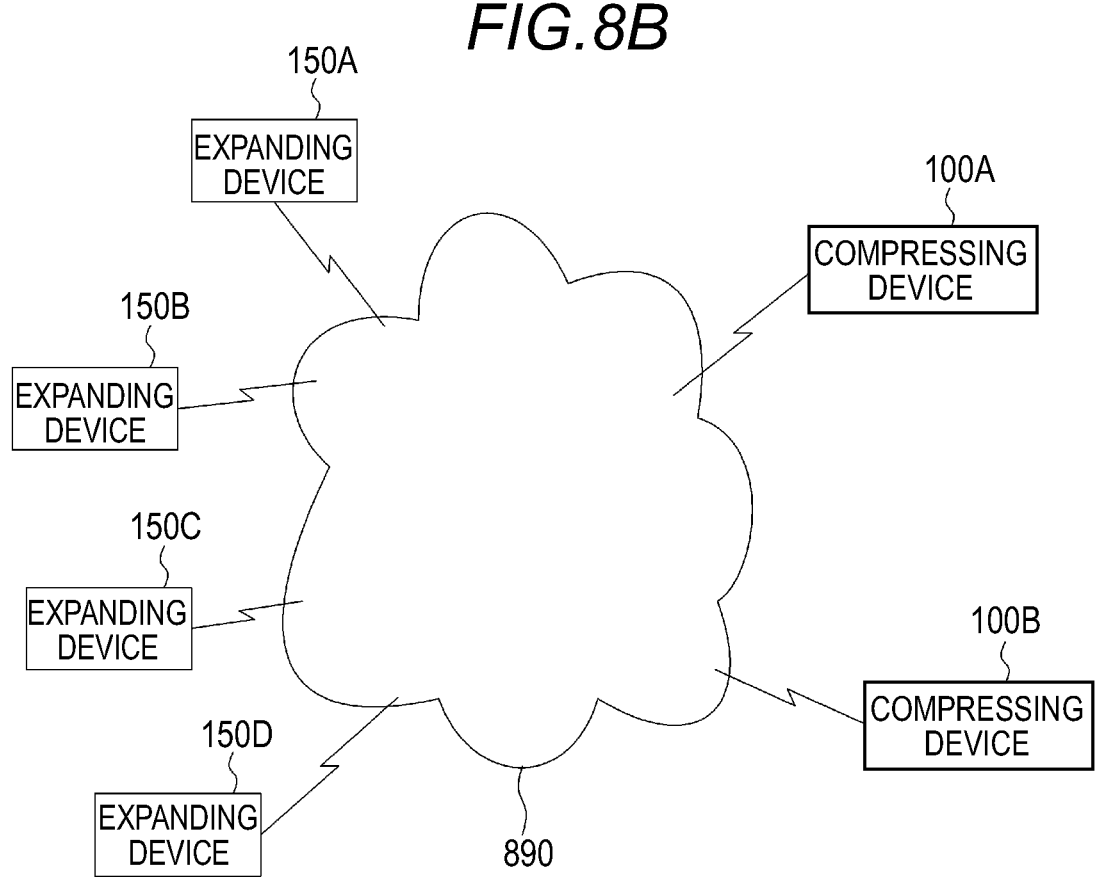

FIGS. 8A and 8B are descriptive diagrams illustrating two system configuration examples that use the present exemplary embodiment.

The example illustrated in FIG. 8A illustrates an example of use in a printer. The example is configured of a drawing device 810, the compressing device 100, a storage device 820, the expanding device 150, and a printer 830.

The drawing device 810 is connected to the compressing device 100. The drawing device 810 generates an image to be printed.

The compressing device 100 is connected to the drawing device 810 and the storage device 820. The compressing device 100 compresses the image.

The storage device 820 is connected to the compressing device 100 and the expanding device 150. The storage device 820 stores a code that results from compression by the compressing device 100.

The expanding device 150 is connected to the storage device 820 and the printer 830. The expanding device 150 expands the code in the storage device 820 to restore the image.

The printer 830 is connected to the expanding device 150. The printer 830 prints the image restored by the expanding device 150.

Data has to be continuously transferred without delay with respect to a printing speed in a case where, for example, the printer 830 is a continuous printer, since a paper roll cannot be stopped. Thus, assuring a compression ratio and achieving a high compression/expansion speed are required. There exist two types of compression (encoding), variable-length encoding and fixed-length encoding.

For a high-resolution (for example, 1,200 dpi) continuous printer, assuring a compression ratio in variable-length encoding is not realistic since a high speed (for example, approximately a few [GB/s]) is required. That is, since the amount of encoding is not determined when trials are not performed in variable-length encoding, it is difficult to guarantee a compression ratio, and it is also difficult to segment codes at the time of expansion. Thus, a fixed-length encoding process is mostly performed in a high-speed printer.

The example illustrated in FIG. 8B illustrates an example of use in sending of an image.

A compressing device 100A, a compressing device 100B, an expanding device 150A, an expanding device 150B, an expanding device 150C, and an expanding device 150D are connected to each other through a communication line 890. The communication line 890 may be a wireless type, a wired type, or a combination thereof and may be, for example, the Internet as a communication infrastructure. Examples of the expanding device 150 include a mobile terminal, a PC, a printer, and the like.

The expanding device 150 reproduces images compressed by the compressing device 100.

(Second Exemplary Embodiment)

FIG. 9 is a conceptual module configuration diagram for a configuration example of a second exemplary embodiment.

A compressing device 900 includes the block splitting module 110, the multiple quantization module 115, a pattern extracting module 920, the feature extracting module 120, the selecting module 125, and the fixed-length encoding module 130. The same parts as those of the above exemplary embodiment will be designated by the same reference signs, and duplicate descriptions thereof will not be provided (the same applies hereinafter). An expanding device that corresponds to the compressing device 900 has the same configuration as the expanding device 150 of the first exemplary embodiment.

The compressing device 900 of the second exemplary embodiment uses a post-quantization pixel value pattern in order to increase the accuracy of ID selection. For example, while ID=1 is a representation that prioritizes resolution more than does ID=2 (by sacrificing the tone), the representation may not achieve high resolution according to circumstances. In order to prevent this, the compressing device 900 performs the selection by using a combination of the dynamic range and the post-quantization pattern (histogram).

The multiple quantization module 115 is connected to the block splitting module 110, the selecting module 125, and the pattern extracting module 920 and receives the block 112 from the block splitting module 110 and passes the quantization result 117 to the pattern extracting module 920 and the selecting module 125.

The pattern extracting module 920 is connected to the multiple quantization module 115 and the selecting module 125 and receives the quantization result 117 from the multiple quantization module 115 and passes a post-quantization pattern 922 to the selecting module 125. The pattern extracting module 920 extracts the form (hereinafter, referred to as a pattern as well) of the quantization result 117 of the multiple quantization module 115.

The selecting module 125 is connected to the multiple quantization module 115, the pattern extracting module 920, the feature extracting module 120, and the fixed-length encoding module 130 and receives the quantization result 117 from the multiple quantization module 115, the post-quantization pattern 922 from the pattern extracting module 920, and the feature 122 from the feature extracting module 120 and passes the "ID+quantization result" 127 to the fixed-length encoding module 130. The selecting module 125 selects the quantization result 117 that corresponds to the post-quantization pattern 922 extracted by the pattern extracting module 920 and to the feature 122 extracted by the feature extracting module 120.

FIGS. 10A and 10B are descriptive diagrams illustrating a process example of the second exemplary embodiment.

Pixel values in a quantization result can be classified into one-color, two-color, three-color, and four-color as patterns. The two-color includes an equal split of the entirety (the right-side example of "not improved" in the examples of FIGS. 10A and 10B) and a check pattern (diagonal values are equivalent; a two-color check pattern in the examples of FIGS. 10A and 10B).

The example of FIG. 10A illustrates an example of patterns for selecting the ID1 in a case where determination is performed with only the feature 122 as in the first exemplary embodiment. When a review is performed on "whether using the ID1 (refer to FIG. 2C) achieves higher resolution than using the ID2 (refer to FIG. 2D)" in comparison with a case where the ID2 is applied, it is illustrated that there exist cases of "not improved", "may be improved", and "improved". That is, since the ID1 is split into four and the ID2 into two, the ID1 is generally supposed to have higher resolution. However, for a case where the entirety has one color and for an equal split of the entirety in two colors (the two examples of "not improved" in the examples of FIGS. 10A and 10B), using the ID1 does not achieve high resolution, and processing the quantization result with the ID2 is apparently advantageous in terms of tone. The resolution is more likely to be improved in the two-color (the left side example of "may be improved" in the examples of FIGS. 10A and 10B excluding the equal split of the entirety in two colors and the check pattern), while the resolution is less likely to be improved in the three-color (the right side example of "may be improved" in the examples of FIGS. 10A and 10B). The resolution is improved in cases of the check pattern and the four-color. Application of the ID1 and the ID2 is divided by a threshold S as illustrated in the example of FIG. 10B.

Specifically, for example, the selecting module 125 makes determination using a feature and pattern correspondence table 1100. FIG. 11 is a descriptive diagram illustrating a data structure example of the feature and pattern correspondence table 1100. The feature and pattern correspondence table 1100 includes a D range field 1110, a one-color field 1120, an equal two-color ID2 field 1130, a two-color field 1140, a check field 1150, a three-color field 1160, and a four-color field 1170. The D range field 1110 stores a dynamic range. The one-color field 1120 stores the pattern in a case of the one-color. The equal two-color ID2 field 1130 stores the pattern in a case of an equal two-color ID2 (an equal split of the entirety in two colors). The two-color field 1140 stores the pattern in a case of the two-color. The check field 1150 stores the pattern in a case of the check pattern. The three-color field 1160 stores the pattern in a case of the three-color. The four-color field 1170 stores the pattern in a case of the four-color. That is, the feature and pattern correspondence table 1100 is a table that is used to select the ID with the feature 122 and the post-quantization pattern 922.

Either the ID1 or the ID2 is used according to a pattern in a case where the dynamic range is 16 to 254 in the example of the feature and pattern correspondence table 1100 (the ID1 is selected in accordance with the feature and quantization ID correspondence table 600 in the first exemplary embodiment).

(Third Exemplary Embodiment)

Figure 12:
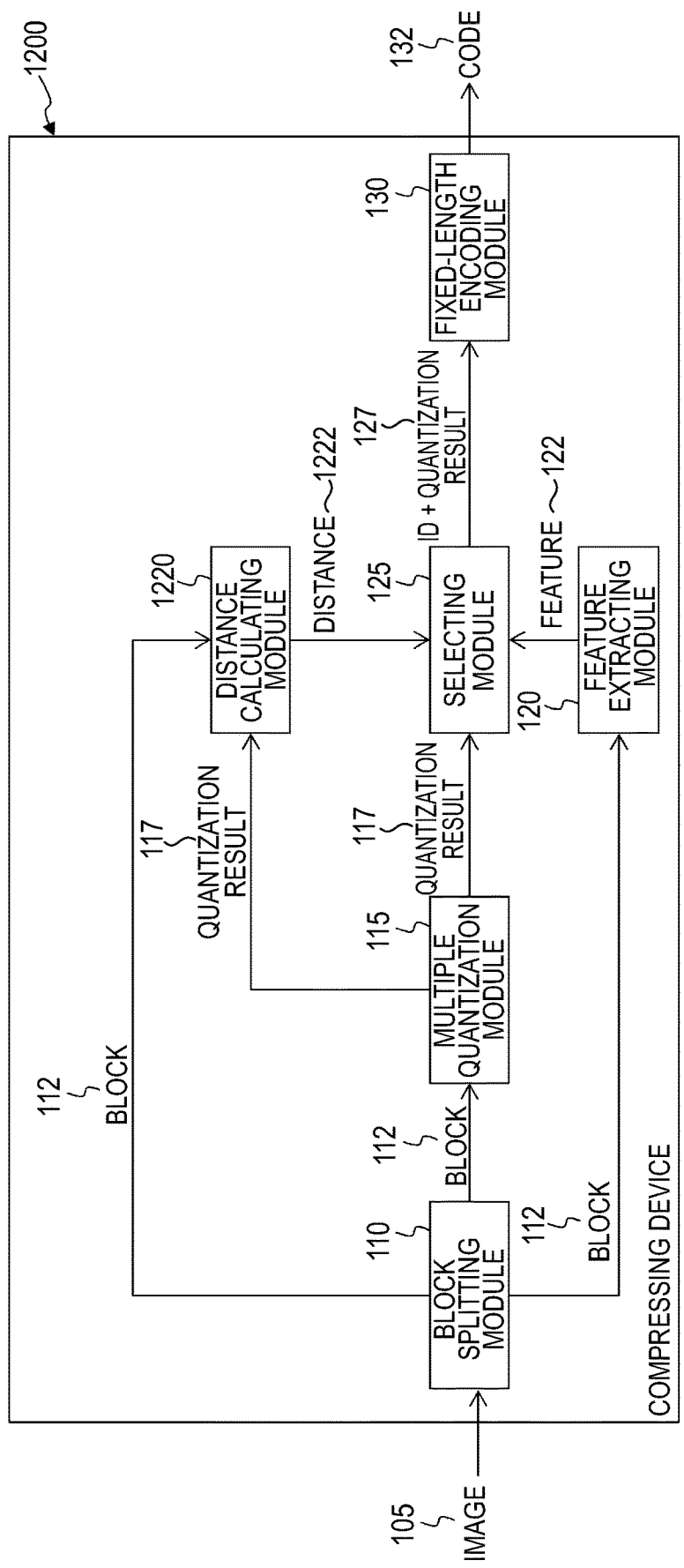
FIG. 12 is a conceptual module configuration diagram for a configuration example of a third exemplary embodiment.

FIG. 12 is a conceptual module configuration diagram for a configuration example of a third exemplary embodiment.

A compressing device 1200 includes the block splitting module 110, the multiple quantization module 115, a distance calculating module 1220, the feature extracting module 120, the selecting module 125, and the fixed-length encoding module 130.

The compressing device 1200 of the third exemplary embodiment changes the form of representation of the resolution even if the tone is the same. An ID3 is added to the IDs of the first exemplary embodiment as illustrated in the example of FIG. 13. A distance is used in identification of the ID2 and the ID3. Increasing vibrations in the ID can achieve higher image quality.

The multiple quantization module 115 is connected to the block splitting module 110, the selecting module 125, and the distance calculating module 1220 and receives the block 112 from the block splitting module 110 and passes the quantization result 117 to the distance calculating module 1220 and the selecting module 125.

The distance calculating module 1220 is connected to the block splitting module 110, the multiple quantization module 115, and the selecting module 125 and receives the block 112 from the block splitting module 110 and the quantization result 117 from the multiple quantization module 115 and passes a distance 1222 to the selecting module 125. The distance calculating module 1220 calculates the distance between the block 112, which is split by the block splitting module 110, and the quantization result 117 of the multiple quantization module 115. For example, Equation (1) is used to calculate distances in a multivalued image. In Equation (1), P denotes a pixel value of an original image, Q denotes a pixel value of a quantization result, and an index i denotes the coordinate position of a pixel.

$$E = \sum_{i}^{\text{in Block}} |P_i - Q_i| \qquad \text{[Equation (1)]}$$

where P and Q are pixel values within the respective images (multiple values)

The selecting module 125 is connected to the multiple quantization module 115, the distance calculating module 1220, the feature extracting module 120, and the fixed-length encoding module 130 and receives the quantization result 117 from the multiple quantization module 115, the distance 1222 from the distance calculating module 1220, and the feature 122 from the feature extracting module 120 and passes the "ID+quantization result" 127 to the fixed-length encoding module 130. The selecting module 125 selects the quantization result 117 that corresponds to the distance 1222 calculated by the distance calculating module 1220 and to the feature 122 extracted by the feature extracting module 120. Specifically, for example, processes that are equivalent to those of the first exemplary embodiment may be performed.

A distance E in a case of the ID2 may be compared with that in a case of the ID3 in a case where the IDs of the same resolution are selected, and the ID having a smaller value of the distance E may be selected.

The third exemplary embodiment may be combined with the second exemplary embodiment. That is, the distance calculating module 1220 may be added to the compressing device 900.

In that case, a determination as to whether or not to perform processes of the distance calculating module 1220 may be performed in accordance with a form identifier and representative pixel value definition table 1300. FIG. 13 is a descriptive diagram illustrating a data structure example of the form identifier and representative pixel value definition table 1300. The form identifier and representative pixel value definition table 1300 includes an ID field 1310 and a form field 1320. The ID field 1310 stores an ID. The form field 1320 stores the form of quantization in the ID. That is, a determination as to whether or not there exist quantization results having the same number of sub-blocks (for example, the ID2 and the ID3) but different forms may be performed.

The processes of the distance calculating module 1220 may be performed in a case where such quantization results exist (for example, in a case where the ID2 and the ID3 exist), and the selecting module 125 may perform determination using the distance 1222 as well. The processes of the distance calculating module 1220 may not be performed in a case where such quantization results do not exist, and the selecting module 125 may perform determination using the feature 122 and the post-quantization pattern 922.

(Fourth Exemplary Embodiment)

Figure 14:
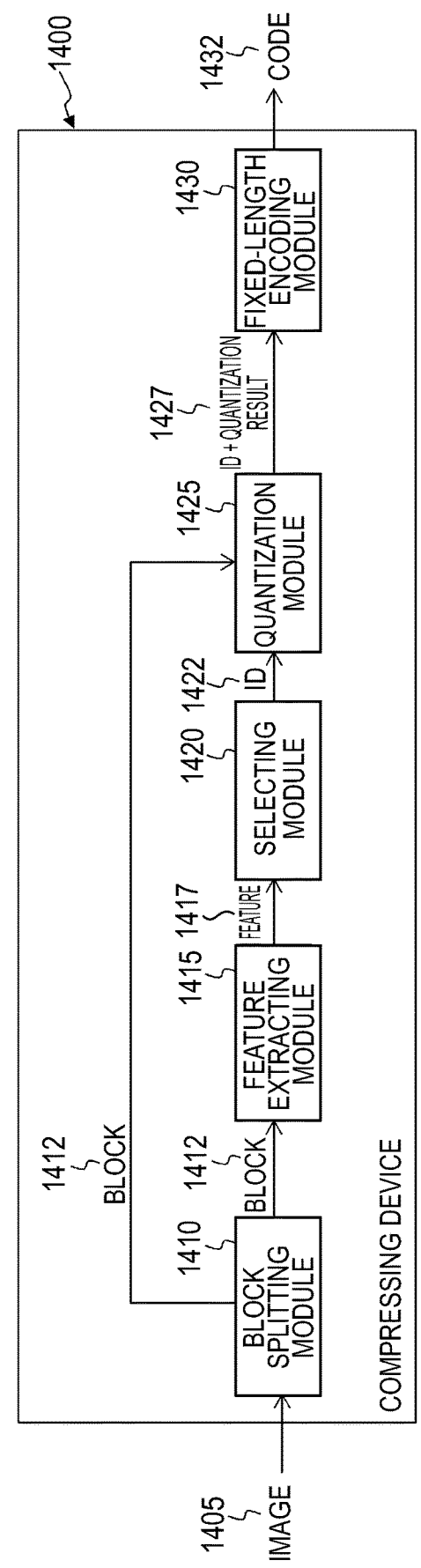
FIG. 14 is a conceptual module configuration diagram for a configuration example of a fourth exemplary embodiment.

FIG. 14 is a conceptual module configuration diagram for a configuration example of a fourth exemplary embodiment. While selection is made after quantization in the above exemplary embodiments, a selecting process may be performed before quantization, and quantization may be performed by using the selected quantization method.

A compressing device 1400 includes a block splitting module 1410, a feature extracting module 1415, a selecting module 1420, a quantization module 1425, and a fixed-length encoding module 1430.

The block splitting module 1410 is connected to the feature extracting module 1415 and the quantization module 1425 and receives an image 1405 and passes a block 1412 to the feature extracting module 1415 and the quantization module 1425. The block splitting module 1410 performs processes equivalent to those of the block splitting module 110. That is, the image 1405 is split into blocks.

The feature extracting module 1415 is connected to the block splitting module 1410 and the selecting module 1420 and receives the block 1412 from the block splitting module 1410 and passes a feature 1417 to the selecting module 1420. The feature extracting module 1415 performs processes equivalent to those of the feature extracting module 120. That is, the feature of the block 1412 is extracted.

The selecting module 1420 is connected to the feature extracting module 1415 and the quantization module 1425 and receives the feature 1417 from the feature extracting module 1415 and passes an ID 1422 to the quantization module 1425. The selecting module 1420 selects a quantization technique (ID) that corresponds to the feature 1417 extracted by the feature extracting module 1415. One quantization technique is selected from multiple quantization techniques that place the resolution and the tone in the quantization result into a trade-off relationship. A selecting process that is equivalent to that of the selecting module 125 is performed. A selection target is the quantization technique and not the quantization result.

The quantization module 1425 is connected to the block splitting module 1410, the selecting module 1420, and the fixed-length encoding module 1430 and receives the block 1412 from the block splitting module 1410 and the ID 1422 from the selecting module 1420 and passes an "ID+quantization result" 1427 to the fixed-length encoding module 1430. The quantization module 1425 quantizes the block 1412, which is split by the block splitting module 1410, using the quantization technique (ID 1422) selected by the selecting module 1420.

The fixed-length encoding module 1430 is connected to the quantization module 1425 and receives the "ID+quantization result" 1427 from the quantization module 1425 and outputs a code 1432. The fixed-length encoding module 1430 performs processes equivalent to those of the fixed-length encoding module 130. That is, fixed-length encoding is performed of the "ID+quantization result" 1427 of the quantization module 1425 to output the code 1432.

(Fifth Exemplary Embodiment)

Figure 15:
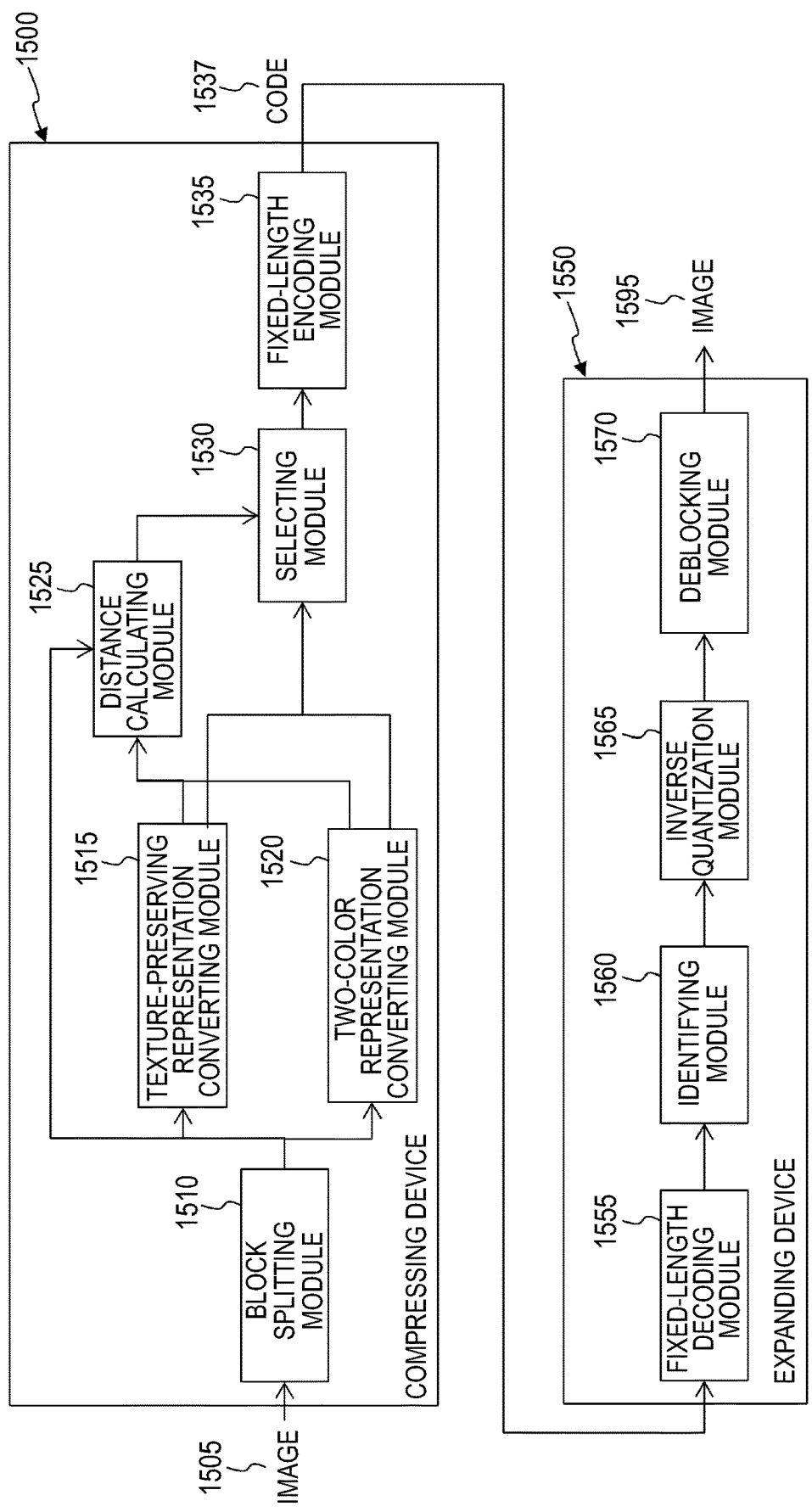
FIG. 15 is a conceptual module configuration diagram for a configuration example of a fifth exemplary embodiment.

FIG. 15 is a conceptual module configuration diagram for a configuration example of a fifth exemplary embodiment.

The BTC disclosed in JP-A-2009-094619 is a fixed-length compression method that represents a block with two types of representative values and in the form of a BTC pattern. The BTC pattern requires 1 [bit/pixel] and a representative value of 8 bits×2=16 [bits] per block. For example, a 4-pixel×4-pixel block (16 pixels) has 8 bits×16 pixels=128 [bits/block] and is compressed to have 1×16+16=32 [bits/block].

Thus, the compression ratio is 128/32=4.

Exemplary embodiments (the fifth and subsequent exemplary embodiments) described in the examples below convert a block into a fixed-length representation according to the feature thereof and thereby reduces image quality deterioration and realizes encoding at a higher compression ratio than the technology disclosed in JP-A-2009-094619. A compressing device 1500 converts a block into a texture-preserving representation or a two-color representation. The texture-preserving representation preserves any texture. The two-color representation represents an image in two colors in any form.

The compressing device 1500 of an image processing apparatus that is the fifth exemplary embodiment compresses an image 1505. An expanding device 1550 of the image processing apparatus that is the fifth exemplary embodiment decodes a code 1537 that is compressed by the compressing device 1500, to generate an image 1595. The fifth exemplary embodiment adds a process of improving the image quality such as character edges and fine lines, compared with the first exemplary embodiment (the first exemplary embodiment to the fourth exemplary embodiment).

The compressing device 1500 includes a block splitting module 1510, a texture-preserving representation converting module 1515, a two-color representation converting module 1520, a distance calculating module 1525, a selecting module 1530, and a fixed-length encoding module 1535.

The block splitting module 1510 receives the image 1505 and is connected to the texture-preserving representation converting module 1515, the two-color representation converting module 1520, and the distance calculating module 1525. The block splitting module 1510 performs processes equivalent to those of the block splitting module 110 of the first exemplary embodiment. The image 1505 is split into blocks. The block is quantized by using multiple methods (two methods in this example).

The texture-preserving representation converting module 1515 is connected to the block splitting module 1510, the distance calculating module 1525, and the selecting module 1530. The texture-preserving representation converting module 1515 quantizes the block split by the block splitting module 1510 in order to preserve the texture in the block.

The two-color representation converting module 1520 is connected to the block splitting module 1510, the distance calculating module 1525, and the selecting module 1530. The two-color representation converting module 1520 represents pixels in the block, which is split by the block splitting module 1510, in multiple colors. The block is quantized into a two-color representation.

Since the texture-preserving representation converting module 1515 and the two-color representation converting module 1520 limit types of representation, the amount of encoding is decreased.

The distance calculating module 1525 is connected to the block splitting module 1510, the texture-preserving representation converting module 1515, the two-color representation converting module 1520, and the selecting module 1530. The distance calculating module 1525 calculates the distance between the block and the quantization result (a quantization result of the texture-preserving representation converting module 1515 and a quantization result of the two-color representation converting module 1520). The distance calculating module 1525 performs processes equivalent to those of the distance calculating module 1220 of the third exemplary embodiment. In this case, there exist two types of distances including the distance between the block and the quantization result of the texture-preserving representation converting module 1515 and the distance between the block and the quantization result of the two-color representation converting module 1520. The distance between the block and the block converted into a fixed-length representation may be calculated by using, for example, above Equation (1).

The selecting module 1530 is connected to the texture-preserving representation converting module 1515, the two-color representation converting module 1520, the distance calculating module 1525, and the fixed-length encoding module 1535. The selecting module 1530 uses the distance calculated by the distance calculating module 1525 to select either the quantization result of the texture-preserving representation converting module 1515 or the quantization result of the two-color representation converting module 1520. That is, the fixed-length representation of one of the texture-preserving representation converting module 1515 and the two-color representation converting module 1520 is selected.

The fixed-length encoding module 1535 is connected to the selecting module 1530 and a fixed-length decoding module 1555 of the expanding device 1550 and passes the code 1537 to the fixed-length decoding module 1555 of the expanding device 1550. The fixed-length encoding module 1535 performs processes equivalent to those of the fixed-length encoding module 130 of the first exemplary embodiment. The fixed-length encoding module 1535 performs fixed-length encoding of the quantization result selected by the selecting module 1530. That is, fixed-length encoding is performed of the ID of the selected fixed-length representation (of the texture-preserving representation converting module 1515 or the two-color representation converting module 1520) and the result of quantization into the fixed-length representation. The code 1537 which is a process result of the fixed-length encoding is passed to the expanding device 1550 through a communication line and the like.

The expanding device 1550 includes the fixed-length decoding module 1555, an identifying module 1560, an inverse quantization module 1565, and a deblocking module 1570.

The fixed-length decoding module 1555 is connected to the fixed-length encoding module 1535 of the compressing device 1500 and the identifying module 1560 and receives the code 1537 from the fixed-length encoding module 1535 of the compressing device 1500. The fixed-length decoding module 1555 performs processes equivalent to those of the fixed-length decoding module 155 of the first exemplary embodiment. The inverse of the conversion by the fixed-length encoding module 1535 is performed. The code 1537 is decoded to obtain the ID of the fixed-length representation selected by the selecting module 1530 and the result of quantization into the fixed-length representation.

The identifying module 1560 is connected to the fixed-length decoding module 1555 and the inverse quantization module 1565. The identifying module 1560 performs processes equivalent to those of the identifying module 160 of the first exemplary embodiment. The ID (the ID of the fixed-length representation) is obtained from the decoded information. The quantization result (ID) selected by the selecting module 1530 is identified as either the quantization result of the texture-preserving representation converting module 1515 or the quantization result of the two-color representation converting module 1520.

The inverse quantization module 1565 is connected to the identifying module 1560 and the deblocking module 1570. The inverse quantization module 1565 performs processes equivalent to those of the inverse quantization module 165 of the first exemplary embodiment. The inverse of the conversion by the texture-preserving representation converting module 1515 or by the two-color representation converting module 1520 is performed. That is, inverse quantization is performed in correspondence with the ID obtained by the identifying module 1560.

The deblocking module 1570 is connected to the inverse quantization module 1565 and outputs the image 1595. The deblocking module 1570 uses the block of pixels obtained after inverse quantization by the inverse quantization module 1565 to generate the image 1595.

Figure 16:
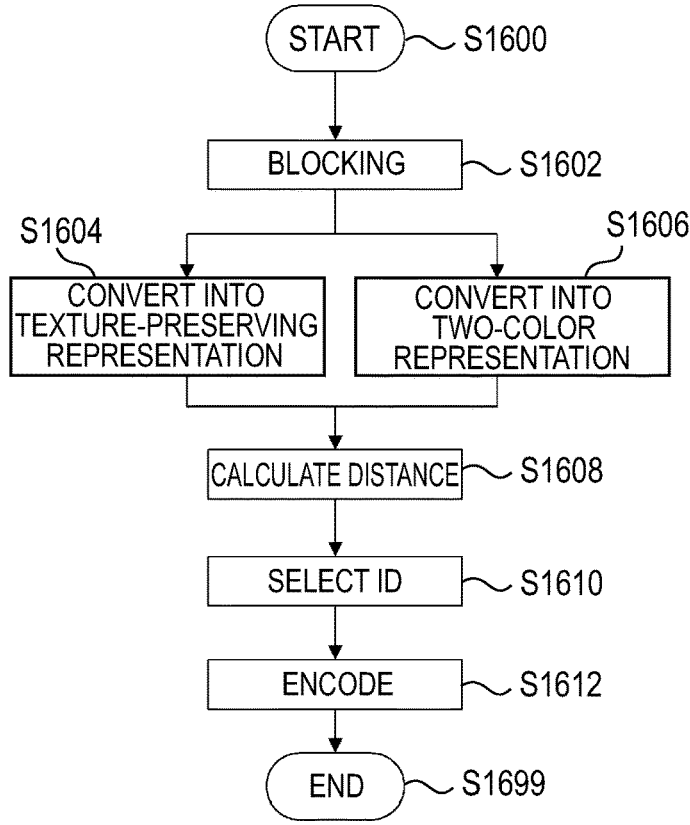
FIG. 16 is a flowchart illustrating a process example of the fifth exemplary embodiment.

FIG. 16 is a flowchart illustrating a process example of the fifth exemplary embodiment (compressing device 1500).

In Step S1602, the block splitting module 1510 performs blocking.

In Step S1604, the texture-preserving representation converting module 1515 performs conversion into a texture-preserving representation.

In Step S1606, the two-color representation converting module 1520 performs conversion into a two-color representation.

In step S1608, the distance calculating module 1525 calculates the distance.

In Step S1610, the selecting module 1530 selects the ID that indicates either the process result of the texture-preserving representation converting module 1515 or the process result of the two-color representation converting module 1520.

In Step S1612, the fixed-length encoding module 1535 performs an encoding process.

Figure 17:
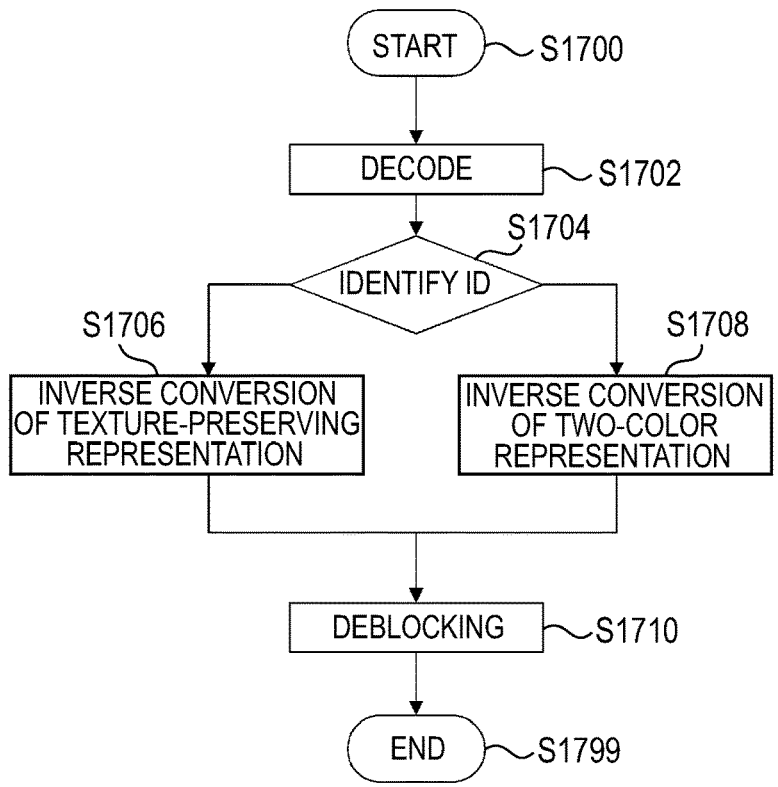
FIG. 17 is a flowchart illustrating a process example of the fifth exemplary embodiment.

FIG. 17 is a flowchart illustrating a process example of the fifth exemplary embodiment (expanding device 1550).

In Step S1702, the fixed-length decoding module 1555 performs a decoding process.

In Step S1704, the identifying module 1560 identifies the ID.

The process proceeds to Step S1706 in a case of a texture-preserving representation and proceeds to Step S1708 in a case of a two-color representation.

In Step S1706, the inverse quantization module 1565 performs inverse conversion of the texture-preserving representation.

In Step S1708, the inverse quantization module 1565 performs inverse conversion of the two-color representation.

In Step S1710, the deblocking module 1570 performs a deblocking process.

FIG. 18 is a descriptive diagram illustrating a process example of the fifth exemplary embodiment.

Figure 19:
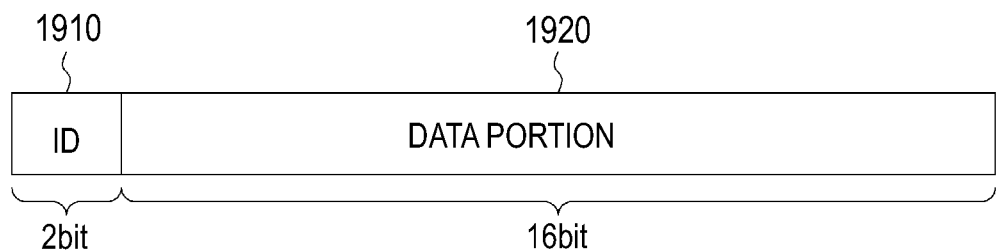
FIG. 19 is a descriptive diagram illustrating a process example of the fifth exemplary embodiment.

For example, a code type (ID) is represented by four types (two bits), and a data portion is represented by 16 bits. At this point, the code length in the fifth exemplary embodiment is, as illustrated in the example of FIG. 19, 18 [bits/block] that is configured of two bits of an ID 1910 and 16 bits of a data portion 1920.

The content of the code type (ID) is illustrated in the example of FIG. 18.

Figure 20A:
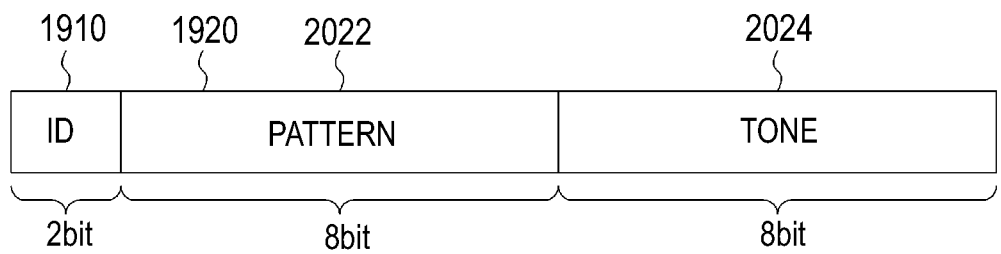
FIGS. 20A and 20B are descriptive diagrams illustrating a process example of the fifth exemplary embodiment.

A code type ID:0 is a "texture-preserving" representation and has "any" form and a data portion of "8 bit pattern and 8 bit tone". As illustrated in the example of FIG. 20A, the ID:0 has 18 [bits/block] that is configured of two bits of the ID 1910 and 16 bits of the data portion 1920 (8 bits of a pattern 2022 and 8 bits of a tone 2024).

A code type ID:1 is a "two-color" representation and is a grid (check pattern) in two colors as illustrated in the form of the ID:1 in FIG. 18 and has a data portion of "8 bit tone of color 1 and 8 bit tone of color 2". As illustrated in the example of FIG. 20B, the ID: 0 has 18 [bits/block] that is configured of two bits of the ID 1910 and 16 bits of the data portion 1920 (8 bits of a tone 2026 of color 1 and 8 bits of a tone 2028 of a color 2).

Figure 20B:
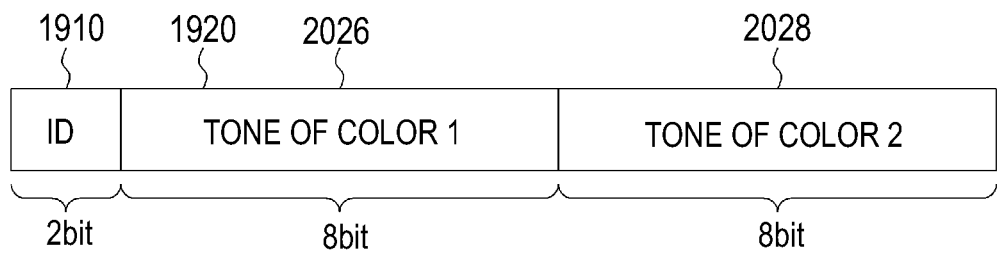

A code type ID:2 is a "two-color" representation and has vertically split two colors on the left and right sides as illustrated in the form of the ID:2 in FIG. 18 and a data portion of "8 bit tone of color 1 and 8 bit tone of color 2" (refer to the example of FIG. 20B).

A code type ID:3 is a "two-color" representation and has horizontally split two colors on the upper and lower sides as illustrated in the form of the ID:3 in FIG. 18 and a data portion of "8 bit tone of color 1 and 8 bit tone of color 2" (refer to the example of FIG. 20B).

FIG. 21 is a descriptive diagram illustrating a process example of the fifth exemplary embodiment (texture-preserving representation converting module 1515).

The texture-preserving representation preserves a pattern and a tone in the data portion. Description will be provided in a case where, for example, the pattern has 8 bits and the tone has 8 bits. The 8 bit pattern is an identifier that specifies any form.

Since the pattern has 8 bits, 256 types of forms can be specified. Hereinafter, the pattern identifier will be referred to as a PID. The 8 bit tone represents the tone of any form specified by the pattern. The average pixel value of pixels corresponding to the specified form is used as a tone value. The color of a part different from the specified form (background color) is fixed to any color. While the background color is regarded as 255 (white), the background color may be freely set according to an applied image or a color space. A texture representation table 2100 illustrated in the example of FIG. 21 is one example of the texture-preserving representation.

The texture representation table 2100 includes a PID field 2110, a 16-bit representation (hexadecimal) field 2120, and a form field 2130. The PID field 2110 illustrates a PID (a value that may be put in the pattern 2022). The PID in the PID field 2110 has a length of 16 bits. The 16-bit representation (hexadecimal) field 2120 illustrates a 16-bit representation (hexadecimal) of the pattern (PID). The form field 2130 illustrates the form of the pattern (PID).

The PID is represented by "0x7777" in 16-bit representation in a case where, for example, the PID is equal to zero, and has a form illustrated in the content of the form field 2130 in the first row of the texture representation table 2100. The form is illustrated as a 4×4 rectangular shape in which the initial bits of each row are set to white (255; fixed) and the other three bits are set as an 8 bit tone.

The PID is represented by "~0x7777" in 16-bit representation in a case where, for example, the PID is equal to one, and has a form illustrated in the content of the form field 2130 in the second row of the texture representation table 2100.

The PID is represented by "0x000f" in 16-bit representation in a case where, for example, the PID is equal to two, and has a form illustrated in the content of the form field 2130 in the third row of the texture representation table 2100.

The PID is represented by "~0x000f" in 16-bit representation in a case where, for example, the PID is equal to three, and has a form illustrated in the content of the form field 2130 in the fourth row of the texture representation table 2100.

The texture-preserving representation by the texture-preserving representation converting module 1515 may set, for example, 10 bits for the pattern 2022 and six bits for the tone 2024. The average pixel value calculated is required to be quantized in a case where the number of bits of tone is decreased. A technology in the related art may be applied as a quantization method. Examples include simple quantization, quantization along with error diffusion that preserves the tone, simple quantization after superimposition of a random number on the average pixel value, and the like.

Representative color may be fixed to 0 (black) in a case where, for example, 16 bits are used for the pattern and zero bits for the tone.

The two-color representation by the two-color representation converting module 1520 represents a block in two colors in any form and preserves each tone (the tone 2026 of color 1 (8 bits) and the tone 2028 of color 2 (8 bits)) in the data portion 1920. While the form is regarded as a grid (ID=1), a left-right form (ID=2), and an upper-lower form (ID=3) as illustrated in the example of FIG. 18, the form may be changed to any form. The tone preserved in the data portion 1920 uses, for example, the average pixel value of a target region.

(Sixth Exemplary Embodiment)

FIG. 22 is a descriptive diagram illustrating a process example of a sixth exemplary embodiment.

The texture-preserving representation of the texture-preserving representation converting module 1515 may represent, for example, the pattern with 8 bits and the tone with four bits+four bits. In this case, the representative color of the pattern is preserved in four bits and the background color in four bits. As illustrated in the example of FIG. 22, an ID 2210 has two bits, a PID 2220 has 8 bits, a tone 2230 of color 1 that is the representative color has four bits, and a tone 2240 of color 2 that is the background color has four bits.

(Seventh Exemplary Embodiment)

FIG. 23 is a descriptive diagram illustrating a process example of a seventh exemplary embodiment.

The two-color representation by the two-color representation converting module 1520 can increase the resolution by increasing the number of forms. For example, the number of forms is increased as illustrated in FIG. 23. At this point, since the ID is of eight types (three bits), the amount of encoding is 3+16=19 [bits/block].

Code types ID:0 to ID:3 are equivalent to those of FIG. 18.

A code type ID:4 is a "two-color" representation and has a form in which the color 2 is at the upper left as illustrated in the form of the ID:4 in FIG. 23, and a data portion of "8 bit tone of color 1 and 8 bit tone of color 2".

A code type ID:5 is a "two-color" representation and has a form in which the color 2 is at the upper right as illustrated in the form of the ID:5 in FIG. 23, and a data portion of "8 bit tone of color 1 and 8 bit tone of color 2".

A code type ID:6 is a "two-color" representation and has a form in which the color 2 is at the lower right as illustrated in the form of the ID:6 in FIG. 23, and a data portion of "8 bit tone of color 1 and 8 bit tone of color 2".

A code type ID:7 is a "two-color" representation and has a form in which the color 2 is at the lower left as illustrated in the form of the ID:7 in FIG. 23, and a data portion of "8 bit tone of color 1 and 8 bit tone of color 2".

(Eighth Exemplary Embodiment)

Figure 24:
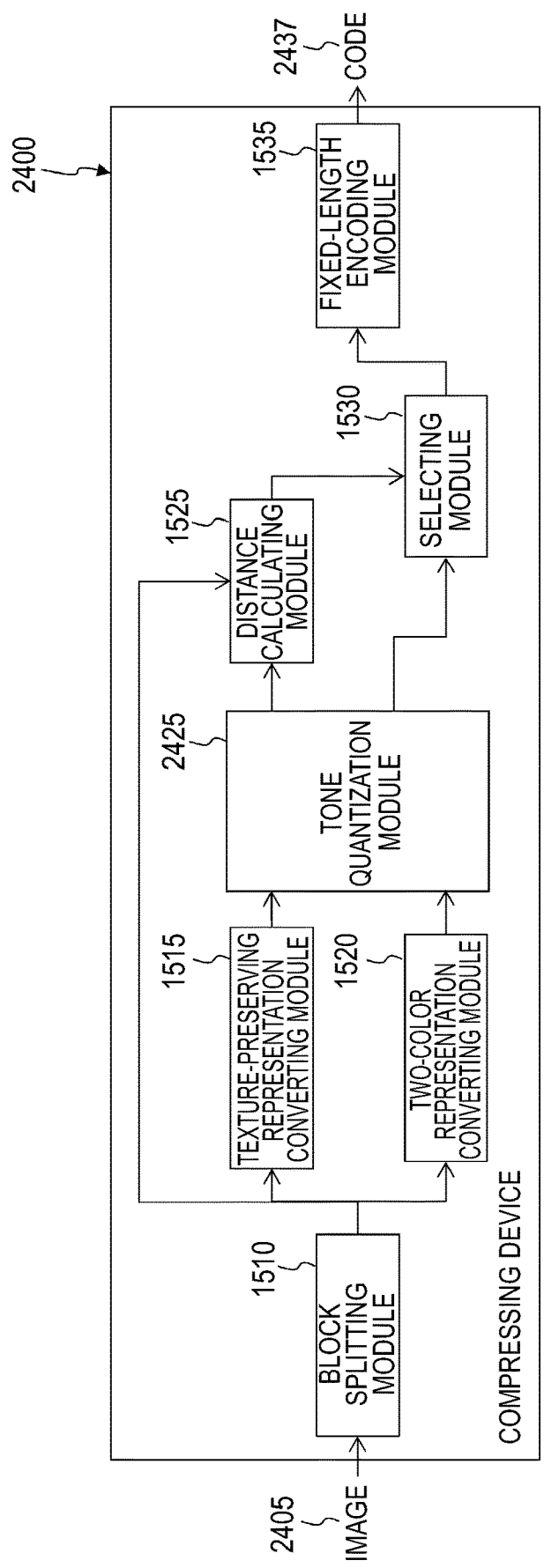
FIG. 24 is a conceptual module configuration diagram for a configuration example of an eighth exemplary embodiment.

FIG. 24 is a conceptual module configuration diagram for a configuration example of an eighth exemplary embodiment. The tone is quantized in the example.

A compressing device 2400 includes the block splitting module 1510, the texture-preserving representation converting module 1515, the two-color representation converting module 1520, a tone quantization module 2425, the distance calculating module 1525, the selecting module 1530, and the fixed-length encoding module 1535.

The block splitting module 1510 receives an image 2405 and is connected to the texture-preserving representation converting module 1515, the two-color representation converting module 1520, and the distance calculating module 1525.

The texture-preserving representation converting module 1515 is connected to the block splitting module 1510 and the tone quantization module 2425.

The two-color representation converting module 1520 is connected to the block splitting module 1510 and the tone quantization module 2425.

The tone quantization module 2425 is connected to the texture-preserving representation converting module 1515, the two-color representation converting module 1520, the distance calculating module 1525, and the selecting module 1530. The tone quantization module 2425 performs tone quantization of at least one or more quantization results of multiple quantization results of the texture-preserving representation converting module 1515 and the two-color representation converting module 1520 (the quantization result of the texture-preserving representation converting module 1515 and the quantization result of the two-color representation converting module 1520).

The distance calculating module 1525 is connected to the block splitting module 1510, the tone quantization module 2425, and the selecting module 1530. The distance calculating module 1525 calculates the distance between the block, which is split by the block splitting module 1510, and a tone quantization result of the tone quantization module 2425.

The selecting module 1530 is connected to the tone quantization module 2425, the distance calculating module 1525, and the fixed-length encoding module 1535. The selecting module 1530 uses the distance calculated by the distance calculating module 1525 to select either the tone quantization result of the tone quantization module 2425 obtained from the quantization result of the texture-preserving representation converting module 1515 or the tone quantization result of the tone quantization module 2425 obtained from the quantization result of the two-color representation converting module 1520.

The fixed-length encoding module 1535 is connected to the selecting module 1530 and outputs a code 2437.

(Ninth Exemplary Embodiment)

Figure 25:
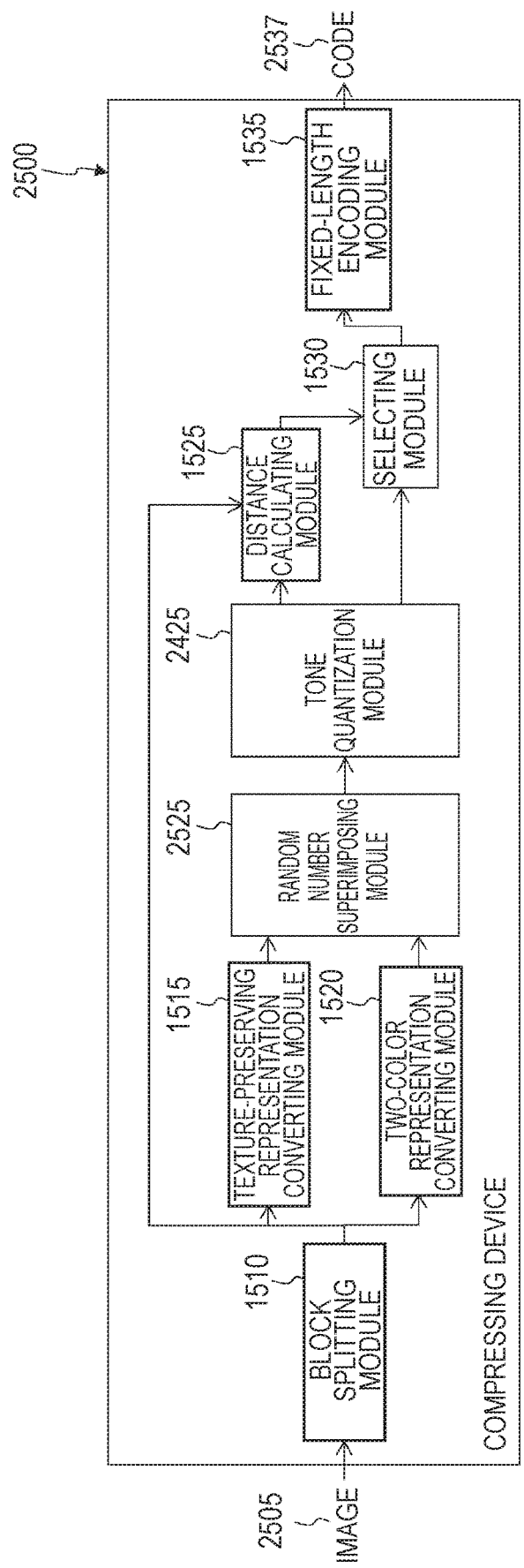
FIG. 25 is a conceptual module configuration diagram for a configuration example of a ninth exemplary embodiment.

FIG. 25 is a conceptual module configuration diagram for a configuration example of a ninth exemplary embodiment. The tone is quantized with a random number superimposed thereon in the example.

A compressing device 2500 includes the block splitting module 1510, the texture-preserving representation converting module 1515, the two-color representation converting module 1520, a random number superimposing module 2525, the tone quantization module 2425, the distance calculating module 1525, the selecting module 1530, and the fixed-length encoding module 1535.

The block splitting module 1510 receives an image 2505 and is connected to the texture-preserving representation converting module 1515, the two-color representation converting module 1520, and the distance calculating module 1525.

The texture-preserving representation converting module 1515 is connected to the block splitting module 1510 and the random number superimposing module 2525.

The two-color representation converting module 1520 is connected to the block splitting module 1510 and the random number superimposing module 2525.

The random number superimposing module 2525 is connected to the texture-preserving representation converting module 1515, the two-color representation converting module 1520, and the tone quantization module 2425. The random number superimposing module 2525 superimposes a random number on at least one or more quantization results of multiple quantization results of the texture-preserving representation converting module 1515 and the two-color representation converting module 1520 (the quantization result of the texture-preserving representation converting module 1515 and the quantization result of the two-color representation converting module 1520). For example, a blue noise mask and the like may be used.

The tone quantization module 2425 is connected to the random number superimposing module 2525, the distance calculating module 1525, and the selecting module 1530. The tone quantization module 2425 performs tone quantization of multiple process results of the random number superimposing module 2525.

The distance calculating module 1525 is connected to the block splitting module 1510, the tone quantization module 2425, and the selecting module 1530.

The selecting module 1530 is connected to the tone quantization module 2425, the distance calculating module 1525, and the fixed-length encoding module 1535. The selecting module 1530 uses the distance calculated by the distance calculating module 1525 to select either the tone quantization result of the tone quantization module 2425 obtained from the process result of the random number superimposing module 2525 obtained from the quantization result of the texture-preserving representation converting module 1515 or the tone quantization result of the tone quantization module 2425 obtained from the process result of the random number superimposing module 2525 obtained from the quantization result of the two-color representation converting module 1520.

The fixed-length encoding module 1535 is connected to the selecting module 1530 and outputs a code 2537.

(Tenth Exemplary Embodiment)

Figure 26:
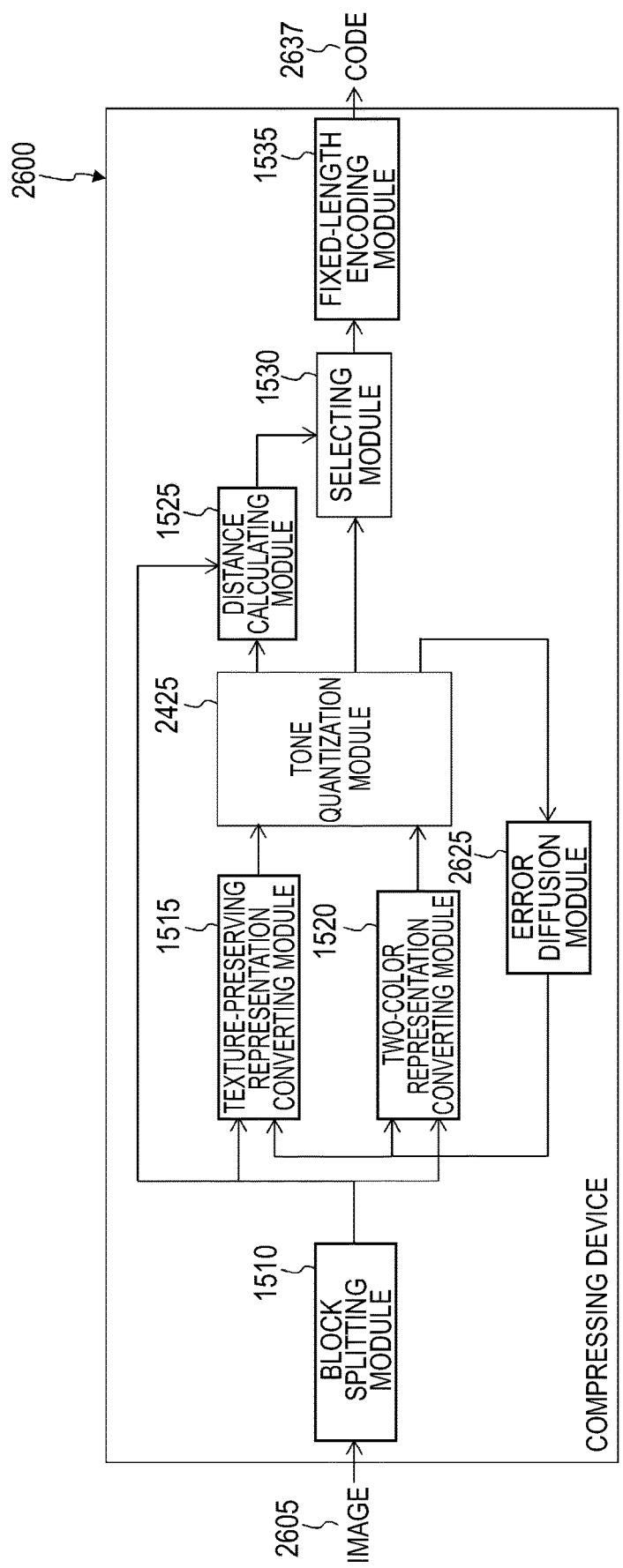
FIG. 26 is a conceptual module configuration diagram for a configuration example of a tenth exemplary embodiment.

FIG. 26 is a conceptual module configuration diagram for a configuration example of a tenth exemplary embodiment. The tone is quantized and is preserved by error diffusion in the example.

A compressing device 2600 includes the block splitting module 1510, the texture-preserving representation converting module 1515, the two-color representation converting module 1520, an error diffusion module 2625, the tone quantization module 2425, the distance calculating module 1525, the selecting module 1530, and the fixed-length encoding module 1535.

The block splitting module 1510 receives an image 2605 and is connected to the texture-preserving representation converting module 1515, the two-color representation converting module 1520, and the distance calculating module 1525.

The texture-preserving representation converting module 1515 is connected to the block splitting module 1510, the tone quantization module 2425, and the error diffusion module 2625.

The two-color representation converting module 1520 is connected to the block splitting module 1510, the tone quantization module 2425, and the error diffusion module 2625.

The tone quantization module 2425 is connected to the texture-preserving representation converting module 1515, the two-color representation converting module 1520, the error diffusion module 2625, the distance calculating module 1525, and the selecting module 1530.

The error diffusion module 2625 is connected to the texture-preserving representation converting module 1515, the two-color representation converting module 1520, and the tone quantization module 2425. The error diffusion module 2625 uses at least one or more tone quantization results of multiple tone quantization results resulting from tone quantization by the tone quantization module 2425 to perform an error diffusion process on the block split by the block splitting module 1510. The block (the block before error diffusion) that is regarded as a target by the error diffusion module 2625 is a block that is different from the block which is regarded as a target by the texture-preserving representation converting module 1515 and the two-color representation converting module 1520. For example, the block is a block of a subsequent process target.

The distance calculating module 1525 is connected to the block splitting module 1510, the tone quantization module 2425, and the selecting module 1530.

The selecting module 1530 is connected to the tone quantization module 2425, the distance calculating module 1525, and the fixed-length encoding module 1535.

The fixed-length encoding module 1535 is connected to the selecting module 1530 and outputs a code 2637.

Expansion of the process results (codes) of the sixth exemplary embodiment to the tenth exemplary embodiment may use the expanding device 1550 of the fifth exemplary embodiment or may be performed by conversion that is the inverse of quantization performed by the compressing device.

(Eleventh Exemplary Embodiment)

Figure 27:
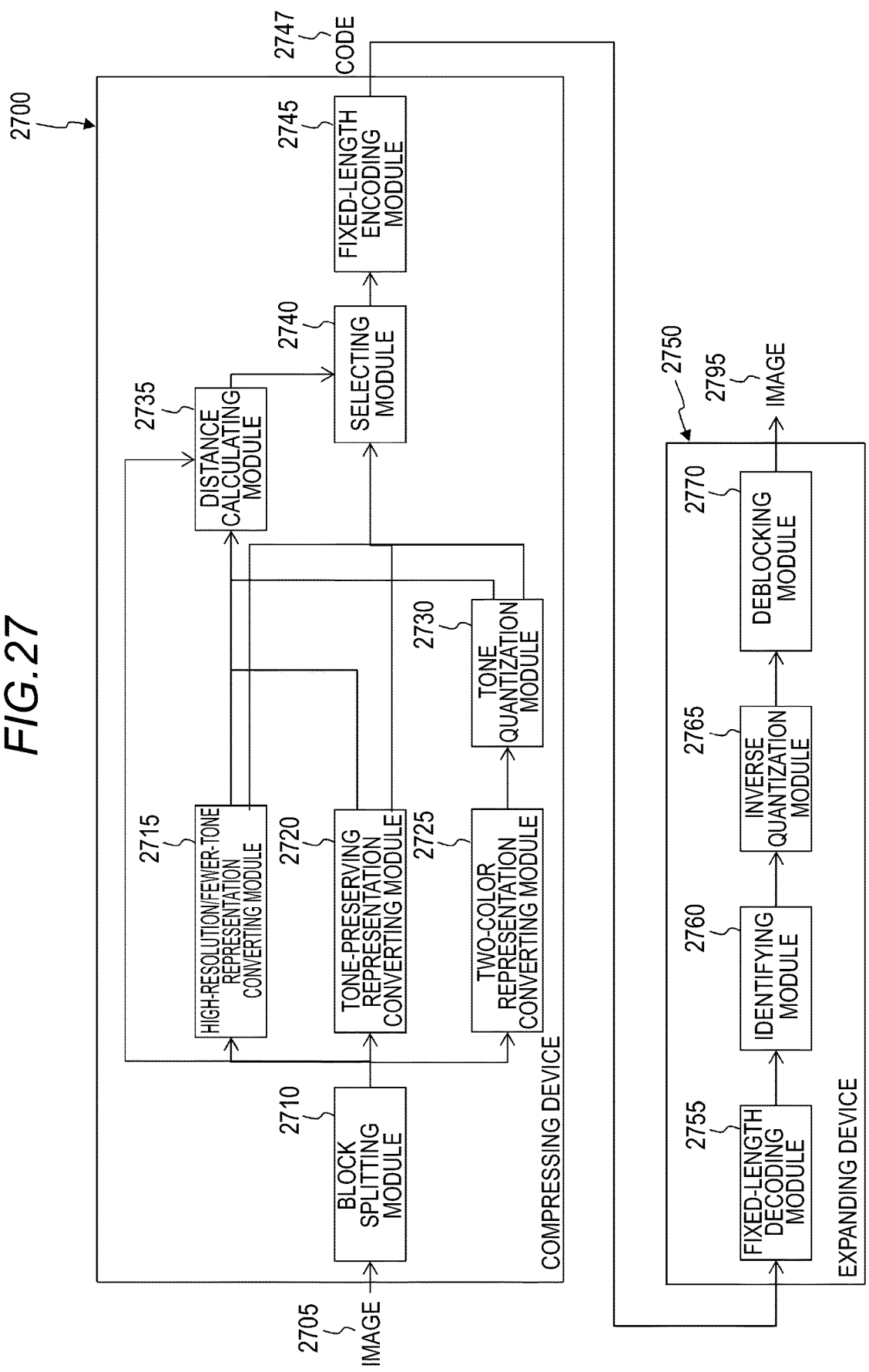
FIG. 27 is a conceptual module configuration diagram for a configuration example of an eleventh exemplary embodiment.

FIG. 27 is a conceptual module configuration diagram for a configuration example of an eleventh exemplary embodiment.

A compressing device 2700 of an image processing apparatus that is the eleventh exemplary embodiment compresses an image 2705. An expanding device 2750 of the image processing apparatus that is the eleventh exemplary embodiment decodes a code 2747 that is compressed by the compressing device 2700, to generate an image 2795. The eleventh exemplary embodiment increases the compression ratio, compared with the first exemplary embodiment. Specifically, while the first exemplary embodiment (the first exemplary embodiment to the fourth exemplary embodiment) achieves 18 to 19 [bits/block], the eleventh exemplary embodiment (the eleventh exemplary embodiment to a twentieth exemplary embodiment) achieves 10 to 11 [bits/block].

The eleventh exemplary embodiment converts a block into one of a high-resolution/fewer-tone representation, a tone-preserving representation, and a two-color representation. The high-resolution/fewer-tone representation preserves the resolution of character edges and fine lines, and the tone-preserving representation preserves the tone of gradations. The two-color representation is between the high-resolution/fewer-tone representation and the tone-preserving representation.

The compressing device 2700 includes a block splitting module 2710, a high-resolution/fewer-tone representation converting module 2715, a tone-preserving representation converting module 2720, a two-color representation converting module 2725, a tone quantization module 2730, a distance calculating module 2735, a selecting module 2740, and a fixed-length encoding module 2745.

The block splitting module 2710 receives the image 2705 and is connected to the high-resolution/fewer-tone representation converting module 2715, the tone-preserving representation converting module 2720, the two-color representation converting module 2725, and the distance calculating module 2735. The block splitting module 2710 performs processes equivalent to those of the block splitting module 110 of the first exemplary embodiment. The image 2705 is split into blocks. The block is quantized by using multiple methods (three methods in this example).

The high-resolution/fewer-tone representation converting module 2715 is connected to the block splitting module 2710, the distance calculating module 2735, and the selecting module 2740. The high-resolution/fewer-tone representation converting module 2715 performs quantization in order to preserve the resolution in the block.

The tone-preserving representation converting module 2720 is connected to the block splitting module 2710, the distance calculating module 2735, and the selecting module 2740. The tone-preserving representation converting module 2720 performs quantization in order to preserve the tone in the block.

The two-color representation converting module 2725 is connected to the block splitting module 2710 and the tone quantization module 2730. The two-color representation converting module 2725 represents the pixels in the block in multiple colors.

The tone quantization module 2730 is connected to the two-color representation converting module 2725, the distance calculating module 2735, and the selecting module 2740. The tone quantization module 2730 performs tone quantization of a process result of the two-color representation converting module 2725.

Since the high-resolution/fewer-tone representation converting module 2715, the tone-preserving representation converting module 2720, the two-color representation converting module 2725, and the tone quantization module 2730 limit types of representation, the amount of encoding is decreased.

The distance calculating module 2735 is connected to the block splitting module 2710, the high-resolution/fewer-tone representation converting module 2715, the tone-preserving representation converting module 2720, the tone quantization module 2730, and the selecting module 2740. The distance calculating module 2735 calculates the distance between the block and the quantization result (a quantization result of the high-resolution/fewer-tone representation converting module 2715, a quantization result of the tone-preserving representation converting module 2720, and a quantization result of the two-color representation converting module 2725 and the tone quantization module 2730). The distance calculating module 2735 performs processes equivalent to those of the distance calculating module 1220 of the third exemplary embodiment. In this case, there exist three types of distances including the distance between the block and the quantization result of the high-resolution/fewer-tone representation converting module 2715, the distance between the block and the quantization result of the tone-preserving representation converting module 2720, and the distance between the block and the quantization result of "the two-color representation converting module 2725 and the tone quantization module 2730". The distance between the block and the block converted into a fixed-length representation may be calculated by using, for example, above Equation (1).

The selecting module 2740 is connected to the high-resolution/fewer-tone representation converting module 2715, the tone-preserving representation converting module 2720, the tone quantization module 2730, the distance calculating module 2735, and the fixed-length encoding module 2745. The selecting module 2740 uses the distance to select one of the quantization results of the high-resolution/fewer-tone representation converting module 2715, the tone-preserving representation converting module 2720, and the two-color representation converting module 2725 and the tone quantization module 2730. That is, one of the fixed-length representations of the high-resolution/fewer-tone representation converting module 2715, the tone-preserving representation converting module 2720, and the two-color representation converting module 2725 and the tone quantization module 2730 is selected.

The fixed-length encoding module 2745 is connected to the selecting module 2740 and a fixed-length decoding module 2755 of the expanding device 2750 and passes the code 2747 to the fixed-length decoding module 2755 of the expanding device 2750. The fixed-length encoding module 2745 performs processes equivalent to those of the fixed-length encoding module 130 of the first exemplary embodiment. The fixed-length encoding module 2745 performs fixed-length encoding of the quantization result selected by the selecting module 2740. That is, fixed-length encoding is performed of the ID of the selected fixed-length representation (of the high-resolution/fewer-tone representation converting module 2715, the tone-preserving representation converting module 2720, or the two-color representation converting module 2725 and the tone quantization module 2730) and the result of quantization into the fixed-length representation. The code 2747 which is a process result of the fixed-length encoding is passed to the expanding device 2750 through a communication line and the like.

The expanding device 2750 includes the fixed-length decoding module 2755, an identifying module 2760, an inverse quantization module 2765, and a deblocking module 2770.

The fixed-length decoding module 2755 is connected to the fixed-length encoding module 2745 of the compressing device 2700 and the identifying module 2760 and receives the code 2747 from the fixed-length encoding module 2745 of the compressing device 2700. The fixed-length decoding module 2755 performs processes equivalent to those of the fixed-length decoding module 155 of the first exemplary embodiment. The inverse of the conversion by the fixed-length encoding module 2745 is performed. The code 2747 is decoded to obtain the ID of the fixed-length representation selected by the selecting module 2740 and the result of quantization into the fixed-length representation.

The identifying module 2760 is connected to the fixed-length decoding module 2755 and the inverse quantization module 2765. The identifying module 2760 performs processes equivalent to those of the identifying module 160 of the first exemplary embodiment. The ID (the ID of the fixed-length representation) is obtained from the decoded information. The quantization result (ID) selected by the selecting module 2740 is identified as either the quantization result of the high-resolution/fewer-tone representation converting module 2715, the quantization result of the tone-preserving representation converting module 2720, or the quantization result of the two-color representation converting module 2725 and the tone quantization module 2730.

The inverse quantization module 2765 is connected to the identifying module 2760 and the deblocking module 2770. The inverse quantization module 2765 performs processes equivalent to those of the inverse quantization module 165 of the first exemplary embodiment. The inverse of the conversion by the high-resolution/fewer-tone representation converting module 2715, the tone-preserving representation converting module 2720, or the two-color representation converting module 2725 and the tone quantization module 2730 is performed. That is, inverse quantization is performed in correspondence with the ID obtained by the identifying module 2760.

The deblocking module 2770 is connected to the inverse quantization module 2765 and outputs the image 2795. The deblocking module 2770 uses the block of pixels obtained after inverse quantization by the inverse quantization module 2765 to generate the image 2795.

Figure 28:
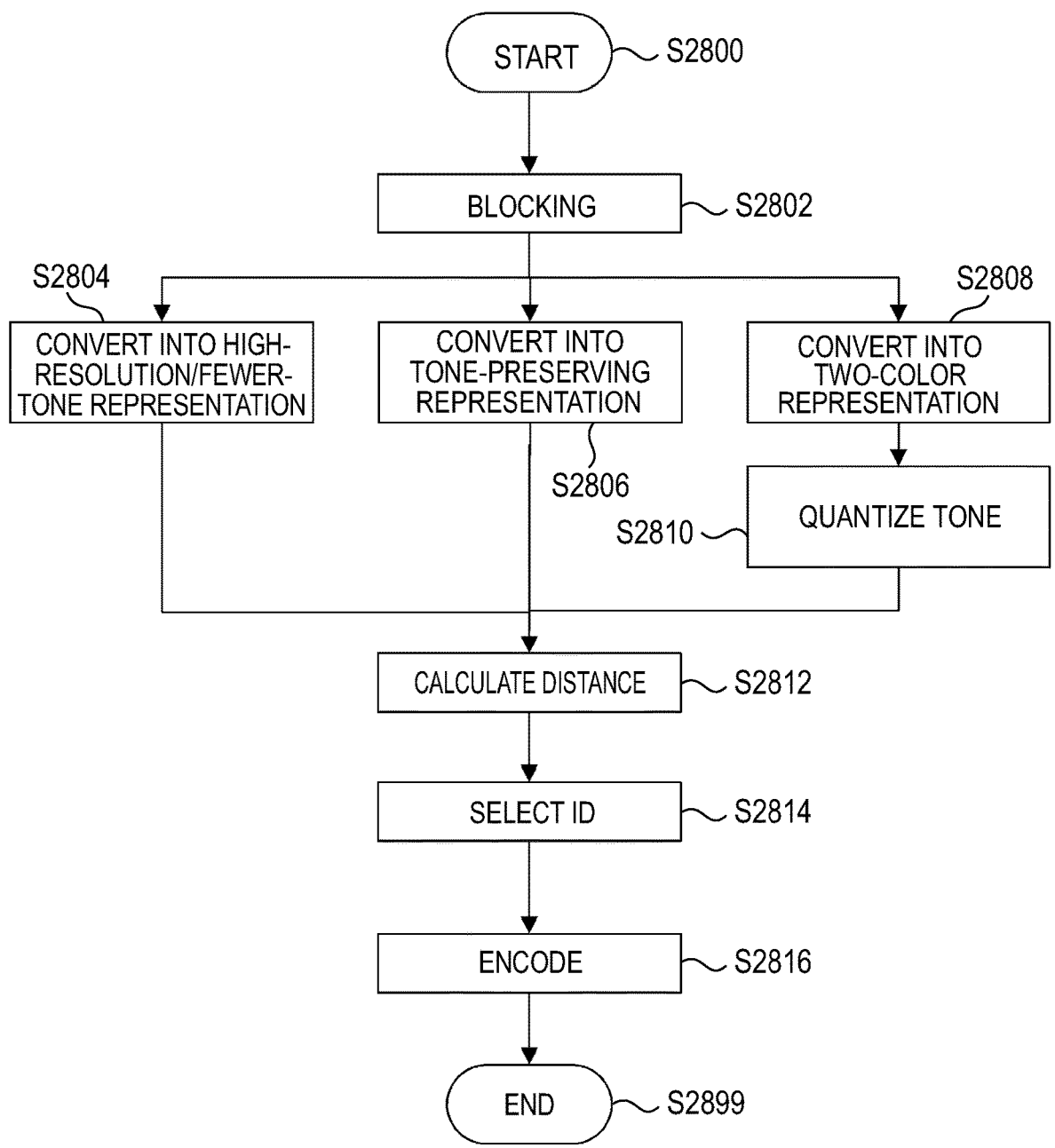
FIG. 28 is a flowchart illustrating a process example of the eleventh exemplary embodiment.

FIG. 28 is a flowchart illustrating a process example of the eleventh exemplary embodiment (compressing device 2700).

In Step S2802, the block splitting module 2710 performs blocking.

In Step S2804, the high-resolution/fewer-tone representation converting module 2715 performs conversion into a high-resolution/fewer-tone representation.

In Step S2806, the tone-preserving representation converting module 2720 performs conversion into a tone-preserving representation.

In Step S2808, the two-color representation converting module 2725 performs conversion into a two-color representation.

In Step S2810, the tone quantization module 2730 quantizes the tone.

In step S2812, the distance calculating module 2735 calculates the distance.

In Step S2814, the selecting module 2740 selects the ID that indicates either the process result of the high-resolution/fewer-tone representation converting module 2715, the process result of the tone-preserving representation converting module 2720, or the process result of the two-color representation converting module 2725 and the tone quantization module 2730.

In Step S2816, the fixed-length encoding module 2745 performs an encoding process.

Figure 29:
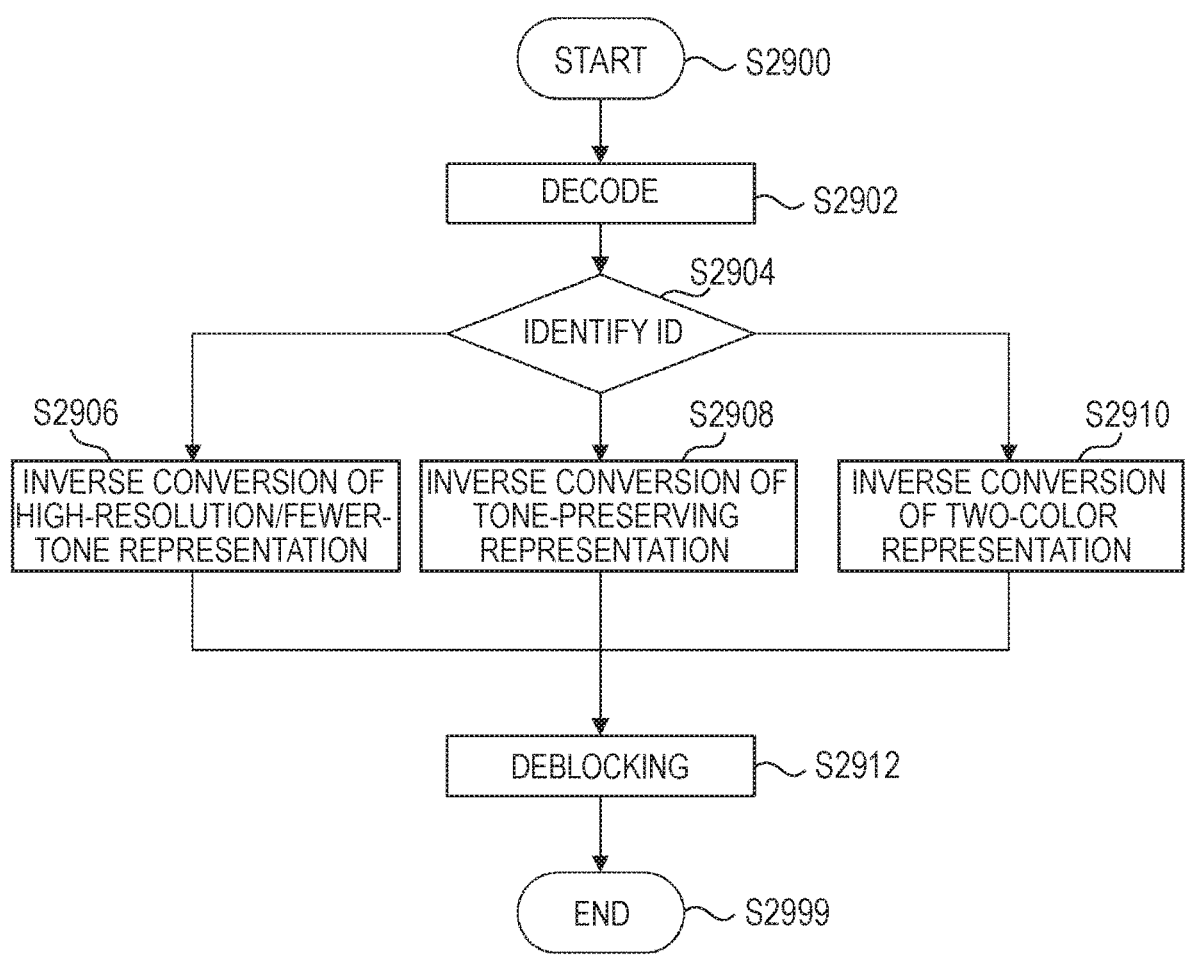
FIG. 29 is a flowchart illustrating a process example of the eleventh exemplary embodiment.

FIG. 29 is a flowchart illustrating a process example of the eleventh exemplary embodiment (expanding device 2750).

In Step S2902, the fixed-length decoding module 2755 performs a decoding process.

In Step S2904, the identifying module 2760 identifies the ID.

The process proceeds to Step S2906 in a case of a high-resolution/fewer-tone representation, proceeds to Step S2908 in a case of a tone-preserving representation, and proceeds to Step S2910 in a case of a two-color representation.

In Step S2906, the inverse quantization module 2765 performs inverse conversion of the high-resolution/fewer-tone representation.

In Step S2908, the inverse quantization module 2765 performs inverse conversion of the tone-preserving representation.

In Step S2910, the inverse quantization module 2765 performs inverse conversion of the quantized tone and performs inverse conversion of the two-color representation.

In Step S2912, the deblocking module 2770 performs a deblocking process.

FIG. 30 is a descriptive diagram illustrating a process example of the eleventh exemplary embodiment.

Figure 31:
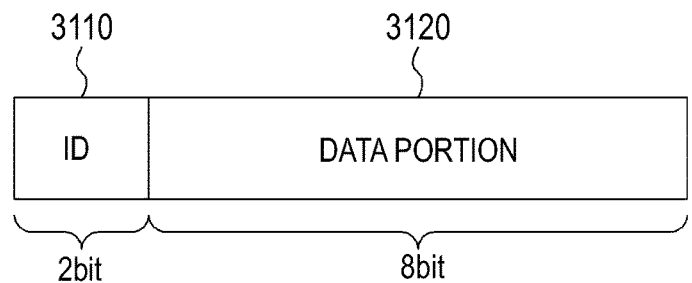
FIG. 31 is a descriptive diagram illustrating a process example of the eleventh exemplary embodiment.

For example, a code type (ID) is represented by four types (two bits), and a data portion is represented by 8 bits. At this point, the code length in the eleventh exemplary embodiment is, as illustrated in the example of FIG. 31, 10 [bits/block] that is configured of two bits of an ID 3110 and 8 bits of a data portion 3120.

The content of the code type (ID) is illustrated in the example of FIG. 30.

Figure 32A:
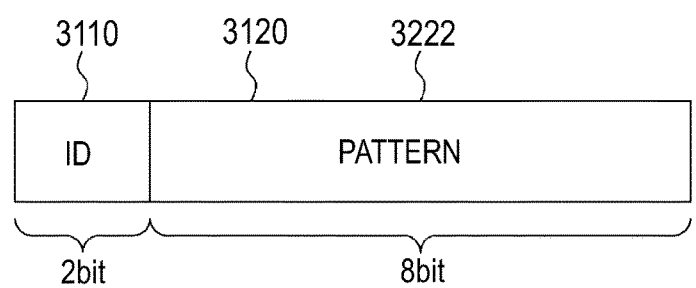
FIGS. 32A, 32B, and 32C are descriptive diagrams illustrating a process example of the eleventh exemplary embodiment.

A code type ID:0 is a "high-resolution/fewer-tone" representation and has "any" form and a data portion of "8 bit pattern". As illustrated in the example of FIG. 32A, the ID:0 has 10 [bits/block] that is configured of two bits of the ID 3110 and 8 bits of a pattern 3222.

Figure 32B:
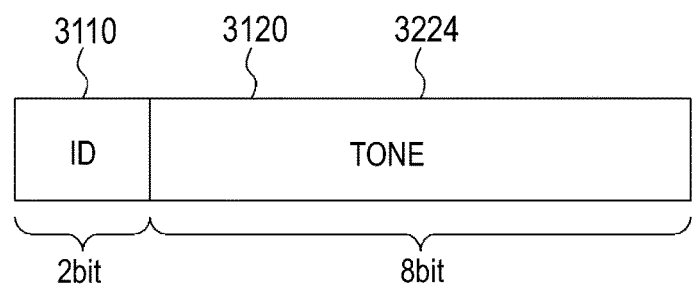

A code type ID:1 is a "tone-preserving" representation and has one color as illustrated in the form of the ID:1 in FIG. 30 and a data portion of "8 bit tone of color 1". As illustrated in the example of FIG. 32B, the ID:1 has 10 [bits/block] that is configured of two bits of the ID 3110 and 8 bits of a tone 3224.

A code type ID:2 is a "two-color" representation and has vertically split two colors on the left and right sides as illustrated in the form of the ID:2 in FIG. 30 and a data portion of "four-bit tone of color 1 and four-bit tone of color 2". As illustrated in the example of FIG. 32C, the ID:2 has 10 [bits/block] that is configured of two bits of the ID 3110 and 8 bits of the data portion 3120 (four bits of a tone 3226 of color 1 and four bits of a tone 3228 of a color 2).

Figure 32C:
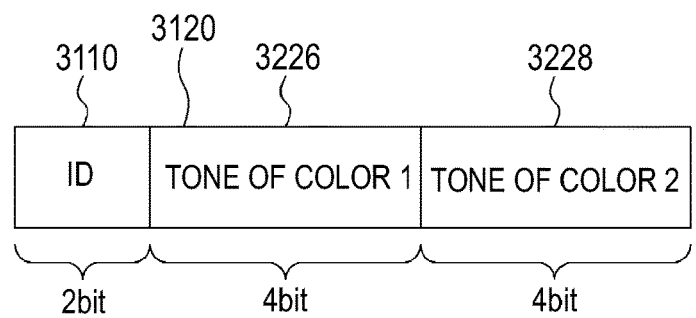

A code type ID:3 is a "two-color" representation and has horizontally split two colors on the upper and lower sides as illustrated in the form of the ID:3 in FIG. 30 and a data portion of "four-bit tone of color 1 and four-bit tone of color 2" (refer to the example of FIG. 32C).

FIG. 33 is a descriptive diagram illustrating a process example of the eleventh exemplary embodiment (high-resolution/fewer-tone representation converting module 2715).

The high-resolution/fewer-tone representation has a pattern in the data portion. For example, the pattern is an identifier that has 8 bits and specifies any form. Since the pattern has 8 bits, 256 types of forms can be specified. The color of any form specified by the pattern (form color) and color of a part different from the form (background color) are fixed to any color. While the form color is regarded as 0 (black) and the background color as 255 (white), the background color may be freely set according to an applied image or a color space. A texture representation table 3300 illustrated in the example of FIG. 33 is one example of the high-resolution/fewer-tone representation.

The texture representation table 3300 includes a PID field 3310, a 16-bit representation (hexadecimal) field 3320, and a form field 3330. The PID field 3310 stores a PID (a value that may be put in the pattern 3222). The PID in the PID field 3310 has a length of 8 bits. The 16-bit representation (hexadecimal) field 3320 stores a 16-bit representation (hexadecimal) of the pattern (PID). The form field 3330 stores the form of the pattern (PID).

The PID is represented by "0x7777" in 16-bit representation in a case where, for example, the PID is equal to zero, and has a form illustrated in the content of the form field 3330 in the first row of the texture representation table 3300. The form is illustrated as a 4×4 rectangular shape in which the initial bits of each row are set to white (255; fixed) and the other three bits are set as an 8 bit tone.

The PID is represented by "~0x7777" in 16-bit representation in a case where, for example, the PID is equal to one, and has a form illustrated in the content of the form field 3330 in the second row of the texture representation table 3300.

The PID is represented by "0x000f" in 16-bit representation in a case where, for example, the PID is equal to two, and has a form illustrated in the content of the form field 3330 in the third row of the texture representation table 3300.

The PID is represented by "~0x000f" in 16-bit representation in a case where, for example, the PID is equal to three, and has a form illustrated in the content of the form field 3330 in the fourth row of the texture representation table 3300.

The high-resolution/fewer-tone representation by the high-resolution/fewer-tone representation converting module 2715 may set, for example, four bits for the pattern and four bits for the tone. The four-bit tone represents the form color.

The average pixel value of the pixels on the form is quantized and retained as the four-bit tone. A technology in the related art may be applied as a quantization method. Examples include simple quantization, quantization along with error diffusion that preserves the tone, simple quantization after superimposition of a random number on the average pixel value, and the like. Apparently, the four-bit tone may be retained as the background color and not the form color.

The tone-preserving representation by the tone-preserving representation converting module 2720 represents a block in a monochromatic manner. As illustrated in the example of FIG. 32B, the data portion 3120 preserves the average pixel value (8 bits).

The two-color representation by the two-color representation converting module 2725 represents a block in two colors in any form and preserves each tone (the tone 3226 of color 1 (four bits) and the tone 3228 of color 2 (four bits)) in the data portion 3120. While the form is regarded as a left-right form (ID=2) and an upper-lower form (ID=3) as illustrated in the example of FIG. 30, the form may be changed to any form. The tone preserved in the data portion 3120 uses, for example, quantization of the average pixel value of a target region. A technology in the related art may be applied as a quantization method. Examples include simple quantization, quantization along with error diffusion that preserves the tone, simple quantization after superimposition of a random number on the average pixel value, and the like.

(Twelfth Exemplary Embodiment)

FIG. 34 is a descriptive diagram illustrating a process example of a twelfth exemplary embodiment.

The high-resolution/fewer-tone representation in the high-resolution/fewer-tone representation converting module 2715 may represent, for example, the pattern with four bits and the tone with two bits+two bits. In this case, the form color is preserved in two bits and the background color in two bits. As illustrated in the example of FIG. 34, an ID 3410 has two bits, a PID 3420 has four bits, and a tone 3430 has four bits.

(Thirteenth Exemplary Embodiment)

FIG. 35 is a descriptive diagram illustrating a process example of a thirteenth exemplary embodiment.

The two-color representation by the two-color representation converting module 2725 can increase the resolution by increasing the number of forms. For example, the number of forms is increased as illustrated in FIG. 35. At this point, since the ID is of eight types (three bits), the amount of encoding is 3+8=11 [bits/block].

Code types ID:0 to ID:3 are equivalent to those of FIG. 30.

A code type ID:4 is a "two-color" representation and has a form in which the color 2 is at the upper left in two color as illustrated in the form of the ID:4 in FIG. 35, and a data portion of "four-bit tone of color 1 and four-bit tone of color 2".

A code type ID:5 is a "two-color" representation and has a form in which the color 2 is at the upper right in two color as illustrated in the form of the ID:5 in FIG. 35, and a data portion of "four-bit tone of color 1 and four-bit tone of color 2".

A code type ID:6 is a "two-color" representation and has a form in which the color 2 is at the lower right in two color as illustrated in the form of the ID:6 in FIG. 35, and a data portion of "four-bit tone of color 1 and four-bit tone of color 2".

A code type ID:7 is a "two-color" representation and has a form in which the color 2 is at the lower left in two color as illustrated in the form of the ID:7 in FIG. 35, and a data portion of "four-bit tone of color 1 and four-bit tone of color 2".

(Fourteenth Exemplary Embodiment)

FIG. 36 is a descriptive diagram illustrating a process example of a fourteenth exemplary embodiment.

The two-color representation by the two-color representation converting module 2725 may be, for example, as illustrated in FIG. 36. A check pattern (ID:2) is added to the two-color patterns in FIG. 36. Adding the check pattern may increase the resolution.

Code types ID:0 and ID:1 are equivalent to those of FIG. 35.

A code type ID:2 is a "two-color" representation and has a check pattern of two colors as illustrated in the form of the ID:2 in FIG. 36 and a data portion of "four-bit tone of color 1 and four-bit tone of color 2".

Code types ID:3 to ID:7 are equivalent to the ID2 to the ID6 of FIG. 35.

While the two-color patterns illustrated in FIG. 36 is configured by replacing the ID:7 of the two-color patterns illustrated in the example of FIG. 35 with a check pattern, any of the ID:4 to the ID:6 of the two-color patterns illustrated in the example of FIG. 35 may be replaced with a check pattern.

(Fifteenth Exemplary Embodiment)

Figure 37:
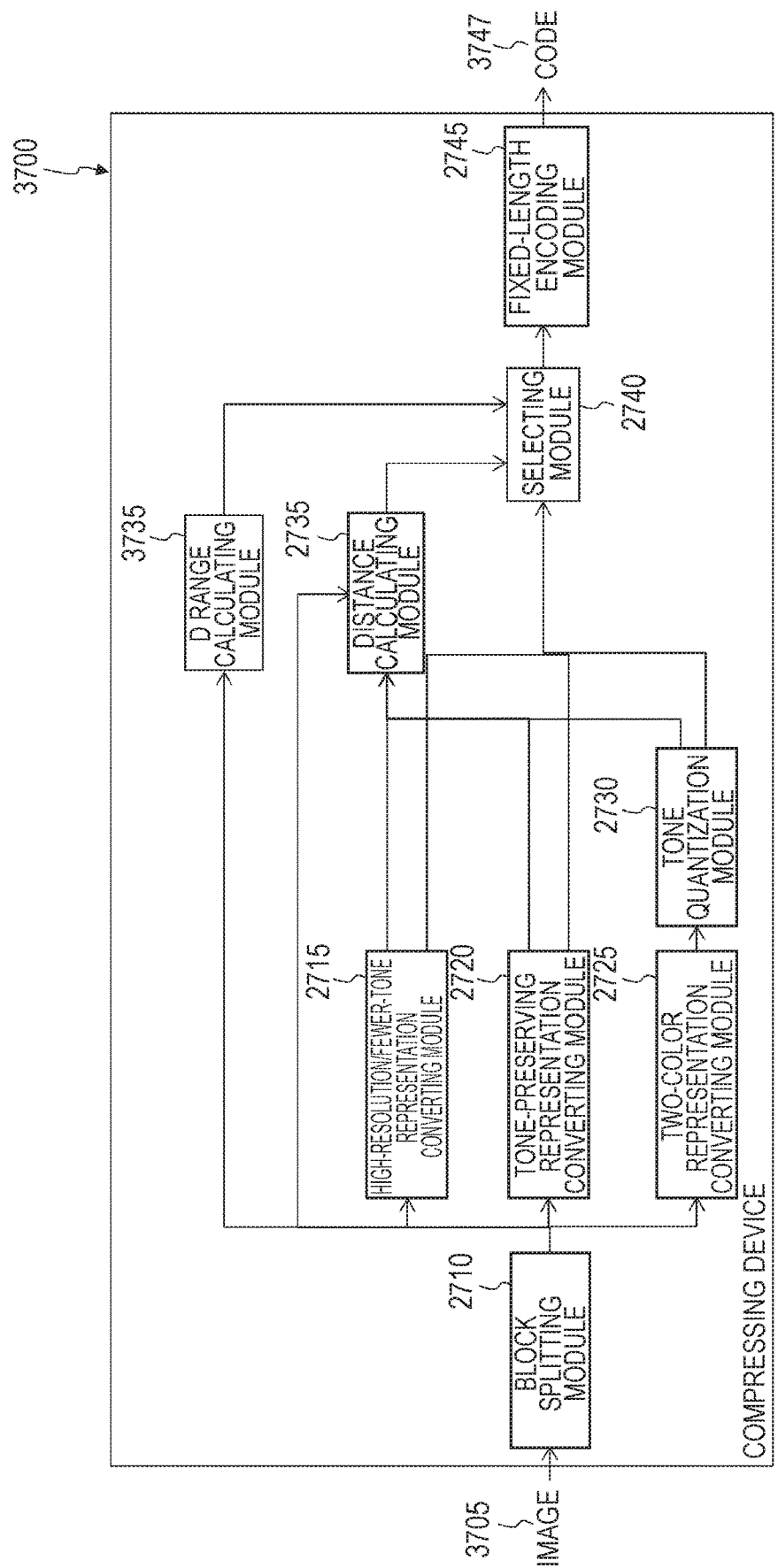
FIG. 37 is a conceptual module configuration diagram for a configuration example of a fifteenth exemplary embodiment.

FIG. 37 is a conceptual module configuration diagram for a configuration example of a fifteenth exemplary embodiment.

The dynamic range in a block may be used in selection of a fixed-length representation. The high-resolution/fewer-tone representation has pixel values of 0/255.

The quantization result of the high-resolution/fewer-tone representation converting module 2715 is selected in a case where the dynamic range is greater than or equal to a predetermined threshold. That is, the high-resolution/fewer-tone representation is prioritized in a case where the dynamic range is equal to 255 or close to 255.

A compressing device 3700 includes the block splitting module 2710, the high-resolution/fewer-tone representation converting module 2715, the tone-preserving representation converting module 2720, the two-color representation converting module 2725, the tone quantization module 2730, a D range calculating module 3735, the distance calculating module 2735, the selecting module 2740, and the fixed-length encoding module 2745.

The block splitting module 2710 receives an image 3705 and is connected to the high-resolution/fewer-tone representation converting module 2715, the tone-preserving representation converting module 2720, the two-color representation converting module 2725, the D range calculating module 3735, and the distance calculating module 2735.

The high-resolution/fewer-tone representation converting module 2715 is connected to the block splitting module 2710, the distance calculating module 2735, and the selecting module 2740.

The tone-preserving representation converting module 2720 is connected to the block splitting module 2710, the distance calculating module 2735, and the selecting module 2740.

The two-color representation converting module 2725 is connected to the block splitting module 2710 and the tone quantization module 2730.

The tone quantization module 2730 is connected to the two-color representation converting module 2725, the distance calculating module 2735, and the selecting module 2740.

The D range calculating module 3735 is connected to the block splitting module 2710 and the selecting module 2740. The D range calculating module 3735 extracts the dynamic range of the block.

The distance calculating module 2735 is connected to the block splitting module 2710, the high-resolution/fewer-tone representation converting module 2715, the tone-preserving representation converting module 2720, the tone quantization module 2730, and the selecting module 2740.

The selecting module 2740 is connected to the high-resolution/fewer-tone representation converting module 2715, the tone-preserving representation converting module 2720, the tone quantization module 2730, the D range calculating module 3735, the distance calculating module 2735, and the fixed-length encoding module 2745. The selecting module 2740 selects the quantization result of the high-resolution/fewer-tone representation converting module 2715 in a case where the dynamic range extracted by the D range calculating module 3735 is greater than or equal to the predetermined threshold. Otherwise (in a case where selection cannot be made with the value of the dynamic range), selection may be made by using the value of the distance calculating module 2735.

The fixed-length encoding module 2745 is connected to the selecting module 2740 and outputs a code 3747.

(Sixteenth Exemplary Embodiment)

Figure 38:
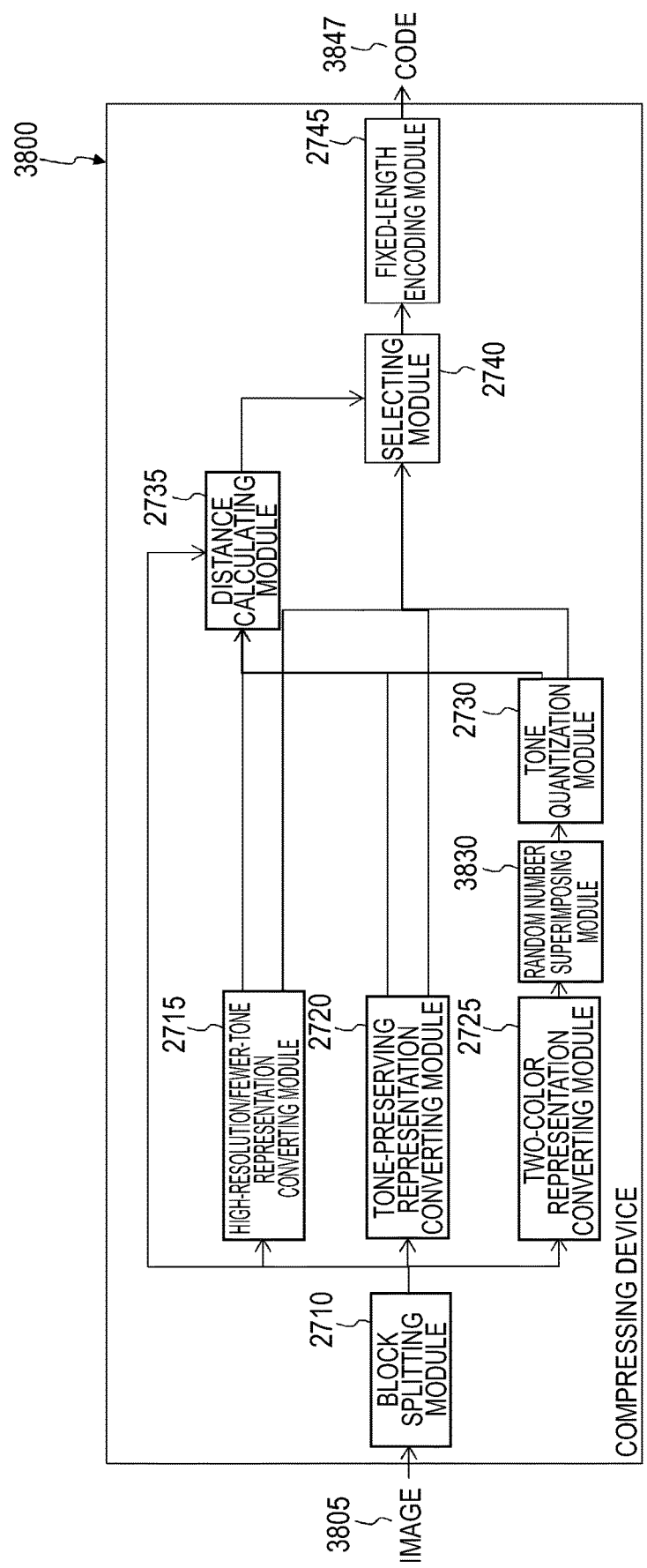
FIG. 38 is a conceptual module configuration diagram for a configuration example of a sixteenth exemplary embodiment.

FIG. 38 is a conceptual module configuration diagram for a configuration example of a sixteenth exemplary embodiment. The tone is quantized with a random number superimposed thereon in the example.

A compressing device 3800 includes the block splitting module 2710, the high-resolution/fewer-tone representation converting module 2715, the tone-preserving representation converting module 2720, the two-color representation converting module 2725, a random number superimposing module 3830, the tone quantization module 2730, the distance calculating module 2735, the selecting module 2740, and the fixed-length encoding module 2745.

The block splitting module 2710 receives an image 3805 and is connected to the high-resolution/fewer-tone representation converting module 2715, the tone-preserving representation converting module 2720, the two-color representation converting module 2725, and the distance calculating module 2735.

The high-resolution/fewer-tone representation converting module 2715 is connected to the block splitting module 2710, the distance calculating module 2735, and the selecting module 2740.

The tone-preserving representation converting module 2720 is connected to the block splitting module 2710, the distance calculating module 2735, and the selecting module 2740.

The two-color representation converting module 2725 is connected to the block splitting module 2710 and the random number superimposing module 3830.

The random number superimposing module 3830 is connected to the two-color representation converting module 2725 and the tone quantization module 2730. The random number superimposing module 3830 superimposes a random number on the process result of the two-color representation converting module 2725 and passes a process result to the tone quantization module 2730. A blue noise mask, for example, may be used as a random number superimposing process.

The tone quantization module 2730 is connected to the random number superimposing module 3830, the distance calculating module 2735, and the selecting module 2740.

The distance calculating module 2735 is connected to the block splitting module 2710, the high-resolution/fewer-tone representation converting module 2715, the tone-preserving representation converting module 2720, the tone quantization module 2730, and the selecting module 2740.

The selecting module 2740 is connected to the high-resolution/fewer-tone representation converting module 2715, the tone-preserving representation converting module 2720, the tone quantization module 2730, the distance calculating module 2735, and the fixed-length encoding module 2745.

The fixed-length encoding module 2745 is connected to the selecting module 2740 and outputs a code 3847.

Figure 39:
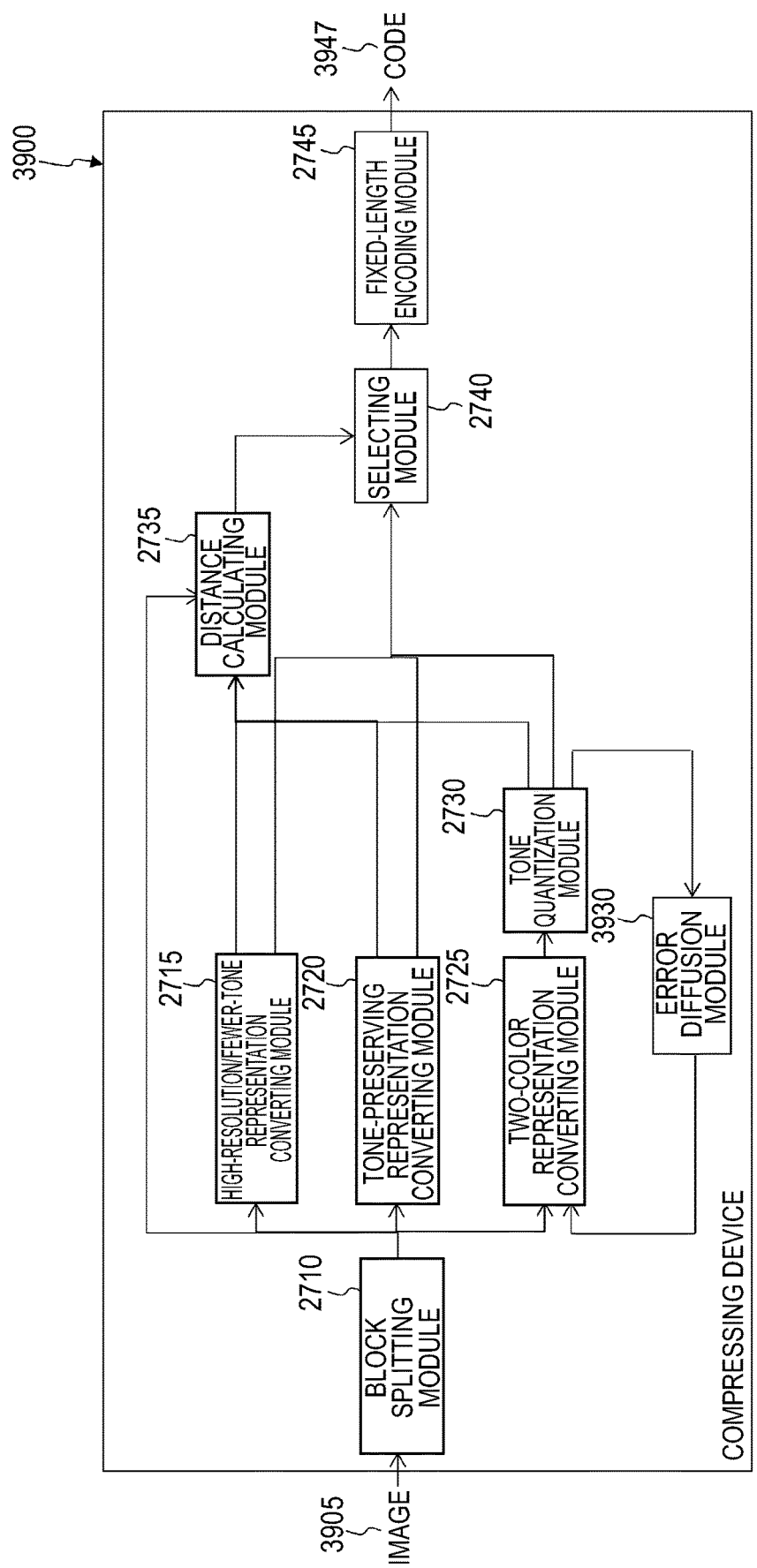
FIG. 39 is a conceptual module configuration diagram for a configuration example of a seventeenth exemplary embodiment.

(Seventeenth Exemplary Embodiment0
FIG. 39 is a conceptual module configuration diagram for a configuration example of a seventeenth exemplary embodiment. The tone is quantized and is preserved by error diffusion in the example.

A compressing device 3900 includes the block splitting module 2710, the high-resolution/fewer-tone representation converting module 2715, the tone-preserving representation converting module 2720, the two-color representation converting module 2725, the tone quantization module 2730, an error diffusion module 3930, the distance calculating module 2735, the selecting module 2740, and the fixed-length encoding module 2745.

The block splitting module 2710 receives an image 3905 and is connected to the high-resolution/fewer-tone representation converting module 2715, the tone-preserving representation converting module 2720, the two-color representation converting module 2725, and the distance calculating module 2735.

The high-resolution/fewer-tone representation converting module 2715 is connected to the block splitting module 2710, the distance calculating module 2735, and the selecting module 2740.

The tone-preserving representation converting module 2720 is connected to the block splitting module 2710, the distance calculating module 2735, and the selecting module 2740.

The two-color representation converting module 2725 is connected to the block splitting module 2710, the tone quantization module 2730, and the error diffusion module 3930.

The tone quantization module 2730 is connected to the two-color representation converting module 2725, the error diffusion module 3930, the distance calculating module 2735, and the selecting module 2740.

The error diffusion module 3930 is connected to the two-color representation converting module 2725 and the tone quantization module 2730. The error diffusion module 3930 uses the tone quantization result of the tone quantization module 2730 to perform an error diffusion process on the block. The block (the block before error diffusion) that is regarded as a target by the error diffusion module 3930 is a block that is different from the block which is regarded as a target by the two-color representation converting module 2725. For example, the block is a block of a subsequent process target.

The distance calculating module 2735 is connected to the block splitting module 2710, the high-resolution/fewer-tone representation converting module 2715, the tone-preserving representation converting module 2720, the tone quantization module 2730, and the selecting module 2740.

The selecting module 2740 is connected to the high-resolution/fewer-tone representation converting module 2715, the tone-preserving representation converting module 2720, the tone quantization module 2730, the distance calculating module 2735, and the fixed-length encoding module 2745.

The fixed-length encoding module 2745 is connected to the selecting module 2740 and outputs a code 3947.

Figure 40:
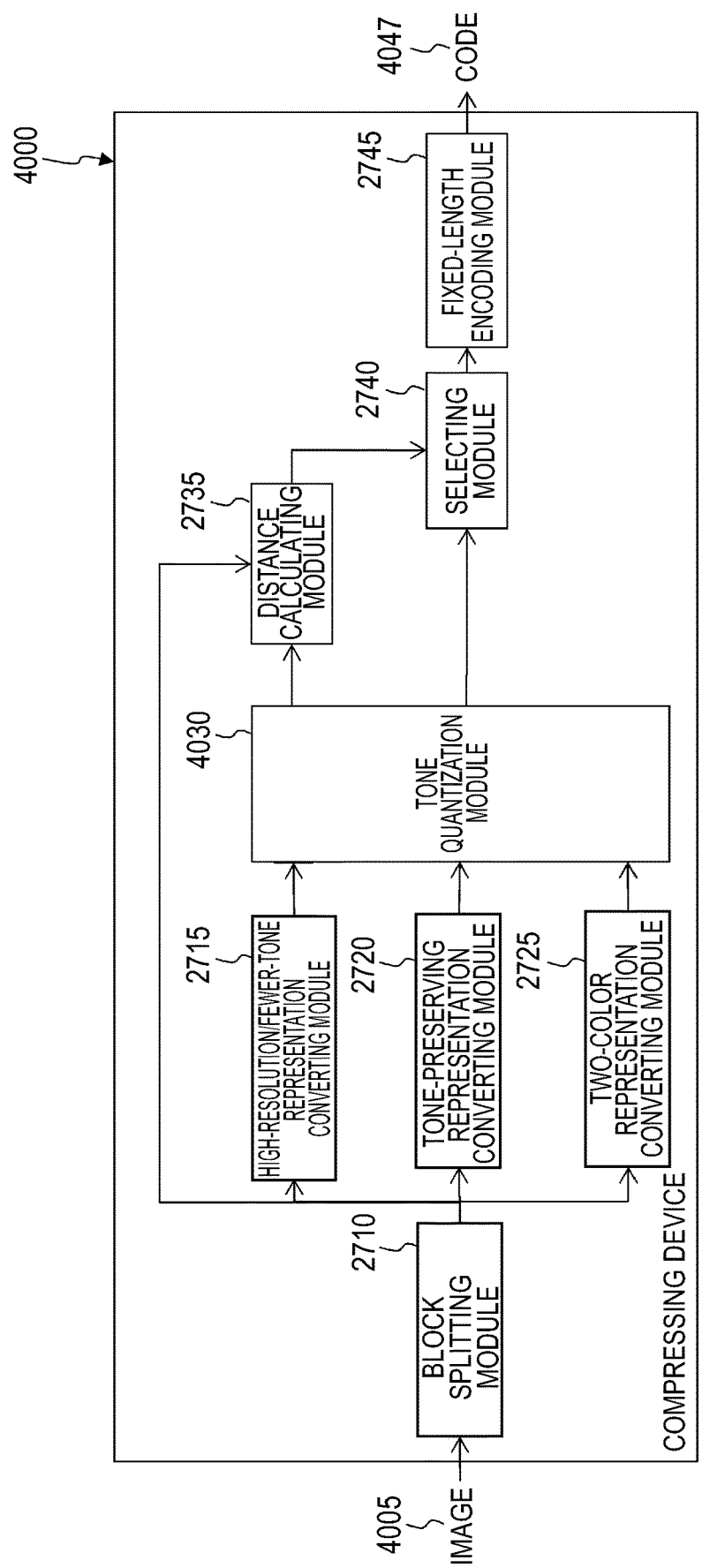
FIG. 40 is a conceptual module configuration diagram for a configuration example of an eighteenth exemplary embodiment.

(Eighteenth Exemplary Embodiment)
FIG. 40 is a conceptual module configuration diagram for a configuration example of an eighteenth exemplary embodiment. The tone is quantized in the example.

A compressing device 4000 includes the block splitting module 2710, the high-resolution/fewer-tone representation converting module 2715, the tone-preserving representation converting module 2720, the two-color representation converting module 2725, a tone quantization module 4030, the distance calculating module 2735, the selecting module 2740, and the fixed-length encoding module 2745.

The block splitting module 2710 receives an image 4005 and is connected to the high-resolution/fewer-tone representation converting module 2715, the tone-preserving representation converting module 2720, the two-color representation converting module 2725, and the distance calculating module 2735.

The high-resolution/fewer-tone representation converting module 2715 is connected to the block splitting module 2710 and the tone quantization module 4030.

The tone-preserving representation converting module 2720 is connected to the block splitting module 2710 and the tone quantization module 4030.

The two-color representation converting module 2725 is connected to the block splitting module 2710 and the tone quantization module 4030.

The tone quantization module 4030 is connected to the high-resolution/fewer-tone representation converting module 2715, the tone-preserving representation converting module 2720, the two-color representation converting module 2725, the distance calculating module 2735, and the selecting module 2740. The tone quantization module 4030 performs tone quantization of at least one or more quantization results of multiple quantization result of the high-resolution/fewer-tone representation converting module 2715, the tone-preserving representation converting module 2720, and the two-color representation converting module 2725 (the quantization result of the high-resolution/fewer-tone representation converting module 2715, the quantization result of the tone-preserving representation converting module 2720, and the quantization result of the two-color representation converting module 2725).

The distance calculating module 2735 is connected to the block splitting module 2710, the tone quantization module 4030, and the selecting module 2740. The distance calculating module 2735 calculates the distance between the block, which is split by the block splitting module 2710, and a tone quantization result of the tone quantization module 4030.

The selecting module 2740 is connected to the tone quantization module 4030, the distance calculating module 2735, and the fixed-length encoding module 2745. The selecting module 2740 uses the distance calculated by the distance calculating module 2735 to select either the tone quantization result of the tone quantization module 4030 obtained from the quantization result of the high-resolution/fewer-tone representation converting module 2715, the tone quantization result of the tone quantization module 4030 obtained from the quantization result of the tone-preserving representation converting module 2720, or the tone quantization result of the tone quantization module 4030 obtained from the quantization result of the two-color representation converting module 2725.

The fixed-length encoding module 2745 is connected to the selecting module 2740 and outputs a code 4047.

(Nineteenth Exemplary Embodiment)

Figure 41:
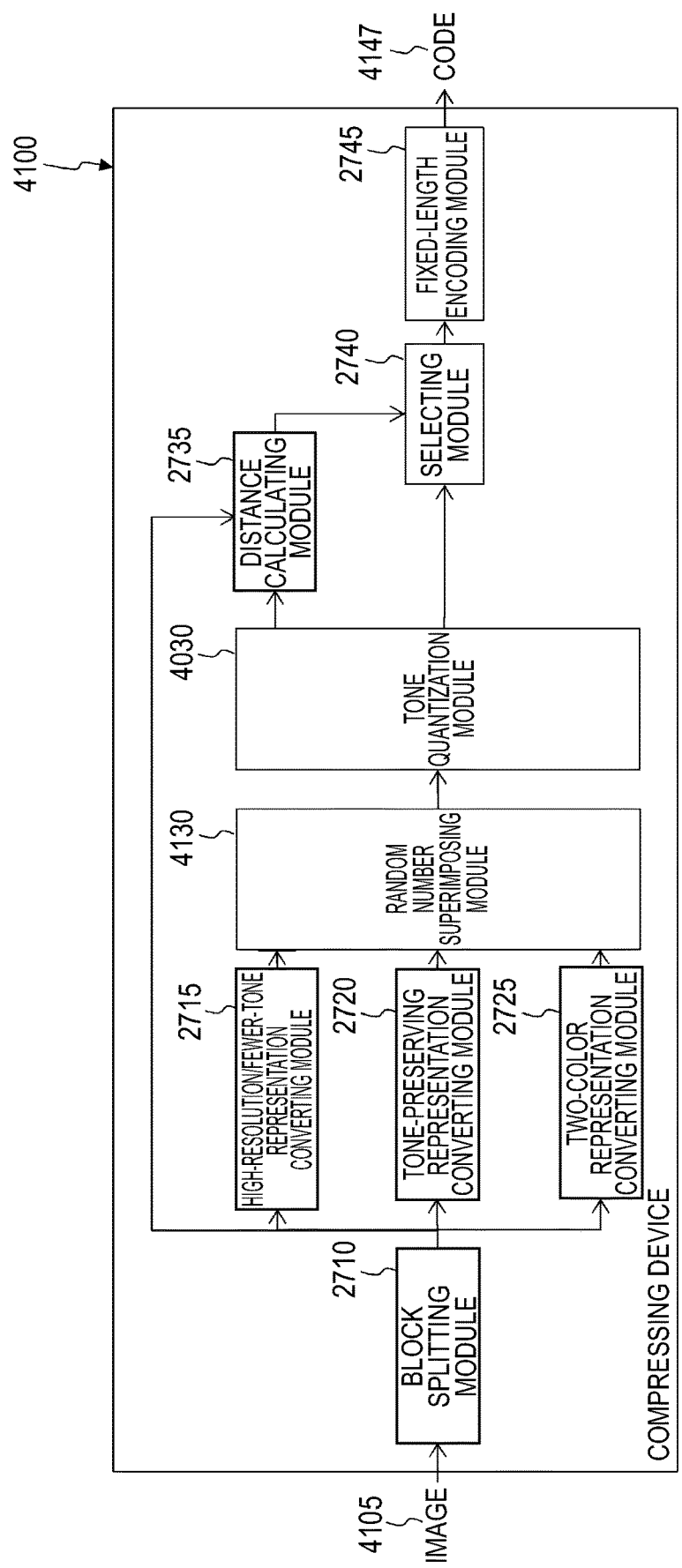
FIG. 41 is a conceptual module configuration diagram for a configuration example of a nineteenth exemplary embodiment.

FIG. 41 is a conceptual module configuration diagram for a configuration example of a nineteenth exemplary embodiment. The tone is quantized with a random number superimposed thereon in the example.

A compressing device 4100 includes the block splitting module 2710, the high-resolution/fewer-tone representation converting module 2715, the tone-preserving representation converting module 2720, the two-color representation converting module 2725, a random number superimposing module 4130, the tone quantization module 4030, the distance calculating module 2735, the selecting module 2740, and the fixed-length encoding module 2745.

The block splitting module 2710 receives an image 4105 and is connected to the high-resolution/fewer-tone representation converting module 2715, the tone-preserving representation converting module 2720, the two-color representation converting module 2725, and the distance calculating module 2735.

The high-resolution/fewer-tone representation converting module 2715 is connected to the block splitting module 2710 and the random number superimposing module 4130.

The tone-preserving representation converting module 2720 is connected to the block splitting module 2710 and the random number superimposing module 4130.

The two-color representation converting module 2725 is connected to the block splitting module 2710 and the random number superimposing module 4130.

The random number superimposing module 4130 is connected to the high-resolution/fewer-tone representation converting module 2715, the tone-preserving representation converting module 2720, the two-color representation converting module 2725, and the tone quantization module 4030. The random number superimposing module 4130 superimposes a random number on at least one or more quantization results of multiple quantization result of the high-resolution/fewer-tone representation converting module 2715, the tone-preserving representation converting module 2720, and the two-color representation converting module 2725 (the quantization result of the high-resolution/fewer-tone representation converting module 2715, the quantization result of the tone-preserving representation converting module 2720, and the quantization result of the two-color representation converting module 2725). For example, a blue noise mask and the like may be used.

The tone quantization module 4030 is connected to the random number superimposing module 4130, the distance calculating module 2735, and the selecting module 2740. The tone quantization module 4030 performs tone quantization of multiple process results of the random number superimposing module 4130.

The distance calculating module 2735 is connected to the block splitting module 2710, the tone quantization module 4030, and the selecting module 2740.

The selecting module 2740 is connected to the tone quantization module 4030, the distance calculating module 2735, and the fixed-length encoding module 2745. The selecting module 2740 uses the distance calculated by the distance calculating module 2735 to select either the tone quantization result of the tone quantization module 4030 obtained from the process result of the random number superimposing module 4130 obtained from the quantization result of the high-resolution/fewer-tone representation converting module 2715, the tone quantization result of the tone quantization module 4030 obtained from the process result of the random number superimposing module 4130 obtained from the quantization result of the tone-preserving representation converting module 2720, or the tone quantization result of the tone quantization module 4030 obtained from the process result of the random number superimposing module 4130 obtained from the quantization result of the two-color representation converting module 2725.

The fixed-length encoding module 2745 is connected to the selecting module 2740 and outputs a code 4147.

(Twentieth Exemplary Embodiment)

Figure 42:
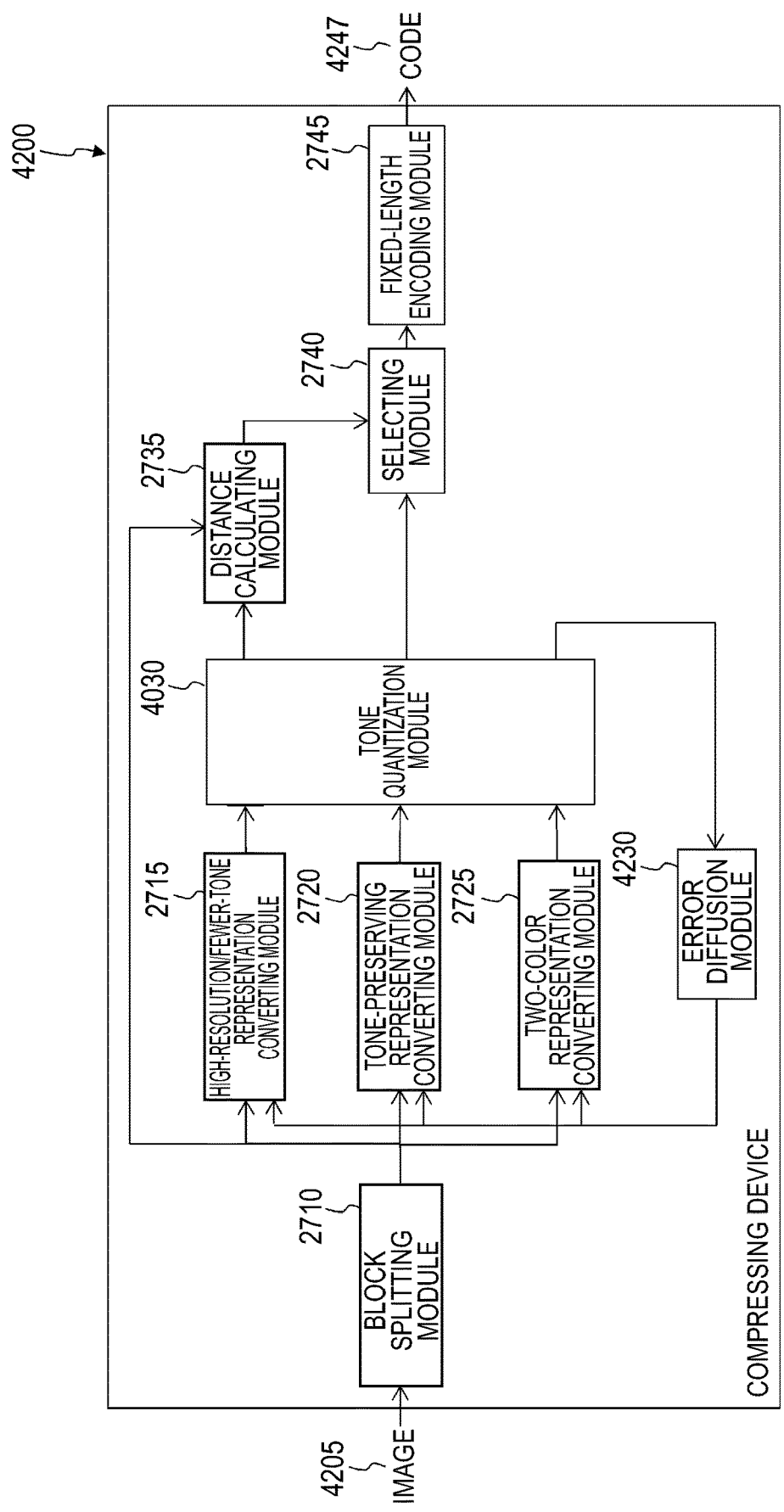
FIG. 42 is a conceptual module configuration diagram for a configuration example of a twentieth exemplary embodiment.

FIG. 42 is a conceptual module configuration diagram for a configuration example of a twentieth exemplary embodiment. The tone is quantized and is preserved by error diffusion in the example.

A compressing device 4200 includes the block splitting module 2710, the high-resolution/fewer-tone representation converting module 2715, the tone-preserving representation converting module 2720, the two-color representation converting module 2725, the tone quantization module 4030, an error diffusion module 4230, the distance calculating module 2735, the selecting module 2740, and the fixed-length encoding module 2745.

The block splitting module 2710 receives an image 4205 and is connected to the high-resolution/fewer-tone representation converting module 2715, the tone-preserving representation converting module 2720, the two-color representation converting module 2725, and the distance calculating module 2735.

The high-resolution/fewer-tone representation converting module 2715 is connected to the block splitting module 2710, the tone quantization module 4030, and the error diffusion module 4230.

The tone-preserving representation converting module 2720 is connected to the block splitting module 2710, the tone quantization module 4030, and the error diffusion module 4230.

The two-color representation converting module 2725 is connected to the block splitting module 2710, the tone quantization module 4030, and the error diffusion module 4230.

The tone quantization module 4030 is connected to the high-resolution/fewer-tone representation converting module 2715, the tone-preserving representation converting module 2720, the two-color representation converting module 2725, the error diffusion module 4230, the distance calculating module 2735, and the selecting module 2740.

The error diffusion module 4230 is connected to the high-resolution/fewer-tone representation converting module 2715, the tone-preserving representation converting module 2720, the two-color representation converting module 2725, and the tone quantization module 4030. The error diffusion module 4230 uses at least one or more quantization results of multiple tone quantization results of the tone quantization module 4030 to perform an error diffusion process on the block split by the block splitting module 2710. The block (the block before error diffusion) that is regarded as a target by the error diffusion module 4230 is a block that is different from the block which is regarded as a target by the high-resolution/fewer-tone representation converting module 2715, the tone-preserving representation converting module 2720, and the two-color representation converting module 2725. For example, the block is a block of a subsequent process target.

The distance calculating module 2735 is connected to the block splitting module 2710, the tone quantization module 4030, and the selecting module 2740.

The selecting module 2740 is connected to the tone quantization module 4030, the distance calculating module 2735, and the fixed-length encoding module 2745.

The fixed-length encoding module 2745 is connected to the selecting module 2740 and outputs a code 4247.

Expansion of the process results (codes) of the twelfth exemplary embodiment to the twentieth exemplary embodiment may use the expanding device 2750 of the eleventh exemplary embodiment or may be performed by conversion that is the inverse of quantization performed by the compressing device.

A hardware configuration example of the image processing apparatus of the present exemplary embodiment will be described with reference to FIG. 43. The configuration illustrated in FIG. 43 is configured of, for example, a personal computer (PC).

Figure 43:
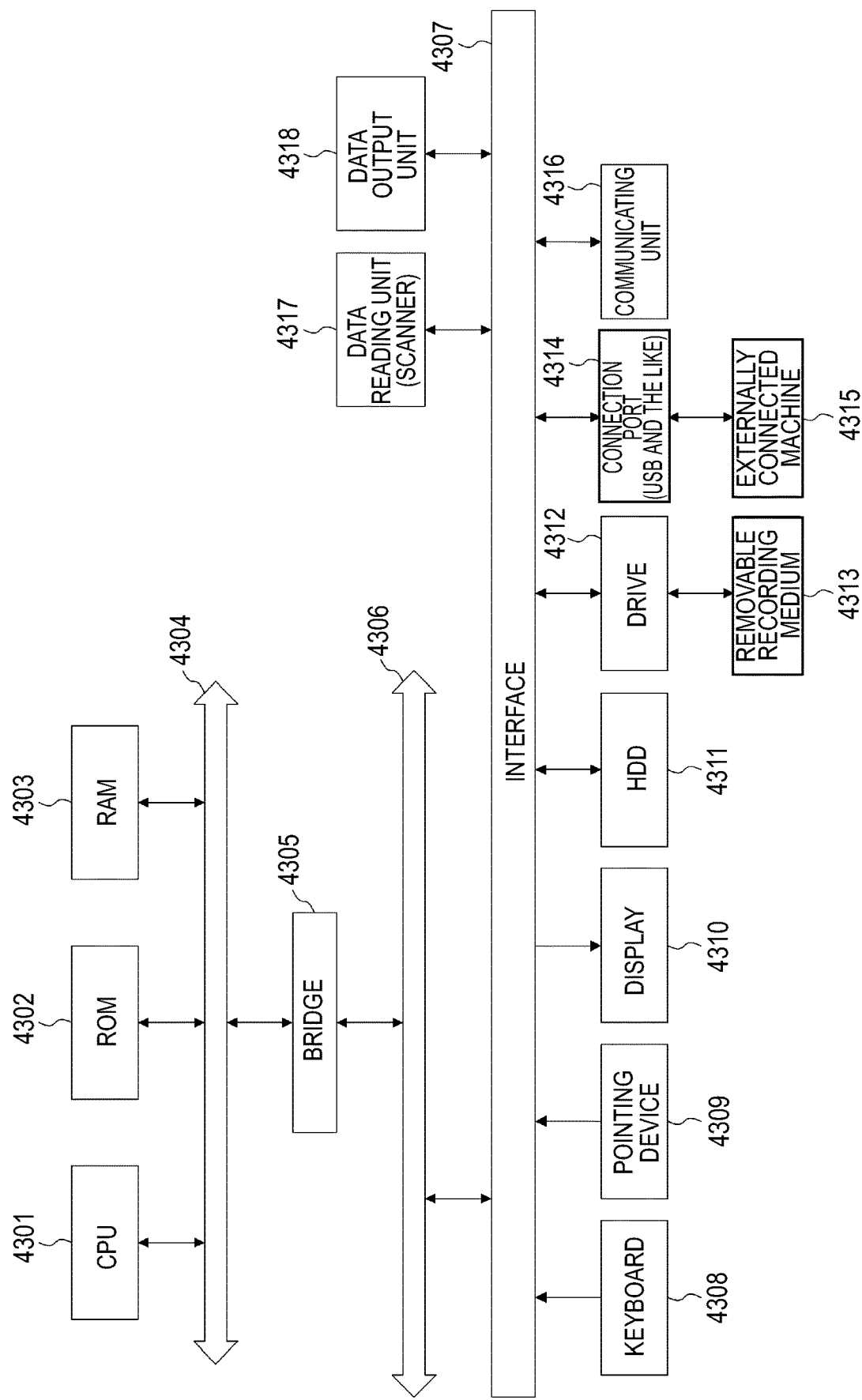
FIG. 43 is a block diagram illustrating a hardware configuration example of a computer that realizes the present exemplary embodiment.

The hardware configuration example illustrated in FIG. 43 includes a data reading unit 4317 such as a scanner and a data output unit 4318 such as a printer.

A central processing unit (CPU) 4301 is a controller that performs processes in accordance with a computer program in which execution sequences of various modules described in the above exemplary embodiments, that is, each module of the block splitting module 110, the multiple quantization module 115, the feature extracting module 120, the selecting module 125, the fixed-length encoding module 130, the fixed-length decoding module 155, the identifying module 160, the inverse quantization module 165, the pattern extracting module 920, the distance calculating module 1220, the block splitting module 1410, the feature extracting module 1415, the selecting module 1420, the quantization module 1425, the fixed-length encoding module 1430, the block splitting module 1510, the texture-preserving representation converting module 1515, the two-color representation converting module 1520, the distance calculating module 1525, the selecting module 1530, the fixed-length encoding module 1535, the fixed-length decoding module 1555, the identifying module 1560, the inverse quantization module 1565, the deblocking module 1570, the block splitting module 2710, the high-resolution/fewer-tone representation converting module 2715, the tone-preserving representation converting module 2720, the two-color representation converting module 2725, the tone quantization module 2730, the distance calculating module 2735, the selecting module 2740, the fixed-length encoding module 2745, the fixed-length decoding module 2755, the identifying module 2760, the inverse quantization module 2765, the deblocking module 2770, and the like, are described.

A read only memory (ROM) 4302 stores programs, operation parameters, and the like used by the CPU 4301. A random access memory (RAM) 4303 stores programs used in execution by the CPU 4301, parameters that are appropriately changed during the execution, and the like. The ROM 4302 and the RAM 4303 are connected to each other by a host bus 4304 that is configured of a CPU bus and the like.

The host bus 4304 is connected to an external bus 4306 such as a peripheral component interconnect/interface (PCI) bus and the like through a bridge 4305.

A keyboard 4308 and a pointing device 4309 such as a mouse are input devices operated by the operator. A display 4310 is a liquid crystal display device, a cathode ray tube (CRT), or the like and displays various types of information as text or image information.

A hard disk drive (HDD) 4311 incorporates a hard disk, drives the hard disk, and records or reproduces information and programs executed by the CPU 4301. The hard disk stores the image 105, the block 112, the quantization result 117, the feature 122, the "ID+quantization result" 127, the code 132, the "ID+quantization result" 157, the quantization result 162, the image 195, and the like. Furthermore, the hard disk stores various computer programs such as other various data processing programs.

A drive 4312 reads data or programs recorded in a removable recording medium 4313 such as a magnetic disk, an optical disc, a magnetooptical disc, a semiconductor memory, or the like mounted and supplies the data or programs to the RAM 4303 that is connected thereto through an interface 4307, the external bus 4306, the bridge 4305, and the host bus 4304. The removable recording medium 4313 may be used as a data recording region like the hard disk.

A connection port 4314 is a port to which an externally connected machine 4315 is connected, and includes a connection unit such as USB, IEEE1394, and the like. The connection port 4314 is connected to the CPU 4301 and the like through the interface 4307, the external bus 4306, the bridge 4305, the host bus 4304, and the like. A communicating unit 4316 is connected to a communication line and performs an external data communication process. The data reading unit 4317 is, for example, a scanner and performs a document reading process. The data output unit 4318 is, for example, a printer and performs a document data output process.

The hardware configuration of the image processing apparatus illustrated in FIG. 43 is one configuration example. The present exemplary embodiment is not limited to the configuration illustrated in FIG. 43 and may have any configuration provided that the modules described in the present exemplary embodiment can be executed. For example, a part of the modules may be configured of dedicated hardware (for example, an application specific integrated circuit (ASIC) and the like).

A part of the modules may be in an external system and may be connected to a communication line.

Furthermore, multiple numbers of the systems illustrated in FIG. 43 may be connected to each other by a communication line and may cooperate with each other. In addition, a part of the modules may be incorporated in a photocopier, a facsimile, a scanner, a printer, a multifunction machine (an image processing apparatus that has two or more functions of a scanner, a printer, a photocopier, a facsimile, and the like), and the like.

The above various exemplary embodiments may be combined (includes, for example, adding or replacing a module between one exemplary embodiment and another exemplary embodiment).

The technology described in Related Art may be adopted as the process contents of each module.

The program described may be provided as being stored in a recording medium.

The program may be provided by a communication unit. In that case, for example, the described program may be perceived as an invention of "a computer readable recording medium in which the program is recorded".

The "computer readable recording medium in which the program is recorded" refers to a computer readable recording medium in which the program is recorded and that is used for installation and execution of the program, distribution of the program, and the like.

Examples of the recording medium include, for example, "DVD-R, DVD-RW, DVD-RAM, and the like" that are digital versatile discs (DVD) and are standards established by the DVD Forum; "DVD+R, DVD+RW, and the like" that are standards established by the DVD+RW Alliance; a read-only memory (CD-ROM), a CD-RECORDABLE (CD-R), a CD-REWRITABLE (CD-RW), and the like that are compact discs (CD); a BLU-RAY (registered trademark) disc; a magneto-optical disc (MO); a flexible disk (FD); a magnetic tape; a hard disk; a read-only memory (ROM); an electrically erasable and rewritable read-only memory (EEPROM (registered trademark)); a flash memory; a random access memory (RAM); and a SECURE DIGITAL (SD) memory card.

A part or the entirety of the program may be, for example, retained or distributed by being recorded in the recording medium. The program may be transferred by using a transfer medium such as a wired network used in, for example, a local area network (LAN), a metropolitan area network (MAN), a wide area network (WAN), the Internet, an intranet, and an extranet; a wireless communication network; or a combination thereof or may be carried by being superimposed on a carrier wave.

Furthermore, the program may be a part of another program or may be recorded in the recording medium along with a different program. The program may be recorded in a split manner in multiple recording media. The program may be recorded in any form such as compression and encryption provided that the program is restorable.

The above exemplary embodiments (particularly, the first exemplary embodiment to the fourth exemplary embodiment) may be recognized as follows.

[A] An image processing apparatus is characterized by including a splitting unit that splits an image into a block, a quantization unit that performs quantization of the block using plural methods, a feature extracting unit that extracts a feature of the block, a selecting unit that selects a quantization result of the quantization unit corresponding to the feature, and an encoding unit that performs fixed-length encoding of the quantization result selected by the selecting unit.

[B] The image processing apparatus according to [A] is characterized in that the quantization unit performs quantization using multiple methods in such a manner that resolution and tone have a trade-off relationship in the quantization result, and the feature extracting unit extracts a dynamic range of the block as the feature.

[C] The image processing apparatus according to [A] or [B] is characterized by further including an extracting unit that extracts a form of the quantization result, in which the selecting unit selects the quantization result corresponding to the form and the feature.

[D] The image processing apparatus according to any one of [A] to [C] is characterized by further including a calculating unit that calculates a distance between the block and the quantization result, in which the selecting unit selects the quantization result corresponding to the distance and the feature.

[E] An image processing apparatus is characterized by including a splitting unit that splits an image into a block, a feature extracting unit that extracts a feature of the block, a selecting unit that selects a quantization technique corresponding to the feature, a quantization unit that quantizes the block using the quantization technique selected by the selecting unit, and an encoding unit that performs fixed-length encoding of a quantization result of the quantization unit.

[F] An image processing program causes a computer to function as a splitting unit that splits an image into a block, a quantization unit that performs quantization of the block using plural methods, a feature extracting unit that extracts a feature of the block, a selecting unit that selects a quantization result of the quantization unit corresponding to the feature, and an encoding unit that performs fixed-length encoding of the quantization result selected by the selecting unit.

[G] An image processing program causes a computer to function as a splitting unit that splits an image into a block, a feature extracting unit that extracts a feature of the block, a selecting unit that selects a quantization technique corresponding to the feature, a quantization unit that quantizes the block using the quantization technique selected by the selecting unit, and an encoding unit that performs fixed-length encoding of a quantization result of the quantization unit.

The above exemplary embodiments of the invention achieve the following effects.

According to the image processing apparatus of [A], fixed-length encoding of the image can be performed without requiring BTC plane region information.

According to the image processing apparatus of [B], quantization can be performed by using multiple methods in such a manner that the resolution and the tone have a trade-off relationship in the quantization result.

According to the image processing apparatus of [C], the quantization result that corresponds to the form of the quantization result and to the feature of the block can be selected.

According to the image processing apparatus of [D], the quantization result that corresponds to the distance between the block and the quantization result and to the feature of the block can be selected.

According to the image processing apparatus of [E], fixed-length encoding of the image can be performed without requiring BTC plane region information.

According to the image processing program of [F], fixed-length encoding of the image can be performed without requiring BTC plane region information.

According to the image processing program of [G], fixed-length encoding of the image can be performed without requiring BTC plane region information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one processor configured to execute a process, the process comprising:
splitting an original image into a block;
extracting a dynamic range of the block as a feature of the block;
performing quantization of the block into multiple representations in which resolution and gradation are traded off;
calculating a distance E between the block and a result of the quantization;
selecting a quantization result of performing the quantization, the quantization result corresponding to the distance E and the feature; and
performing fixed-length encoding of the quantization result selected in the selecting,
wherein the quantization includes performing a first quantization that preserves texture in the block, and performing a second quantization that represents pixels in the block in a plurality of colors.

2. The image processing apparatus according to claim 1, wherein the process further comprises:
performing tone quantization of one or more quantization results of a plurality of quantization results;
calculating the distance E between the block and a result of performing the tone quantization; and
in the selecting, using the distance E to select either a tone quantization result obtained from a quantization result of performing the first quantization or a tone quantization result obtained from a quantization result of performing the second quantization.

3. The image processing apparatus according to claim 2, wherein the process further comprises:
superimposing a random number on one or more quantization results of a plurality of quantization results of performing the quantization; and
performing tone quantization of a plurality of process results of superimposing the random number.

4. The image processing apparatus according to claim 2, wherein the process further comprises:
performing an error diffusion process on the block using one or more tone quantization results of a plurality of tone quantization results of performing the tone quantization.

5. An image processing apparatus comprising:
at least one processor configured to execute a process, the process comprising:
splitting an original image into a block;
extracting a dynamic range of the block as a feature of the block;
performing quantization of the block into multiple representations in which resolution and gradation are traded off;
calculating a distance E between the block and a result of the quantization;
selecting a quantization result of performing the quantization, the quantization result corresponding to the distance E and the feature; and
performing fixed-length encoding of the quantization result selected in the selecting,
wherein the quantization includes performing a first quantization that preserves resolution in the block, performing a second quantization that preserves tone in the block, and performing a third quantization that represents pixels in the block in a plurality of colors and performs tone quantization.

6. The image processing apparatus according to claim 5, wherein the process further comprises:
selecting a quantization result of performing the first quantization when the dynamic range is greater than or equal to a predetermined threshold.

7. The image processing apparatus according to claim 5, wherein the process further comprises:
in the third quantization, superimposing a random number, and performing the tone quantization.

8. The image processing apparatus according to claim 5, wherein the process further comprises:
performing an error diffusion process on the block using a tone quantization result of performing the third quantization.

9. A non-transitory computer readable medium storing an image processing program that causes a computer to function as:
a splitting unit that splits an original image into a block;
an extracting unit that extract a dynamic range of the block as a feature of the block;
a quantization unit that performs quantization of the block into multiple representations in which resolution and gradation are traded off;
a calculating unit that calculates a distance E between the block and a result of the quantization;
a selecting unit that selects a quantization result of the quantization unit, the quantization result corresponding to the distance E and the feature; and
an encoding unit that performs fixed-length encoding of the quantization result selected by the selecting unit,
wherein the quantization unit includes a first quantization unit that preserves texture in the block, and a second quantization unit that represents pixels in the block in a plurality of colors.

10. A non-transitory computer readable medium storing an image processing program that causes a computer to function as:
a splitting unit that splits an original image into a block;
an extracting unit that extract a dynamic range of the block as a feature of the block;
a quantization unit that performs quantization of the block into multiple representations in which resolution and gradation are traded off;
a calculating unit that calculates a distance E between the block and a result of the quantization;
a selecting unit that selects a quantization result of the quantization unit, the quantization result corresponding to the distance E and the feature; and an encoding unit that performs fixed-length encoding of the quantization result selected by the selecting unit, wherein the quantization unit includes a first quantization unit that preserves resolution in the block, a second quantization unit that preserves tone in the block, and a third quantization unit that represents pixels in the block in a plurality of colors and performs tone quantization.

\* \* \* \* \*